United States Patent [19]
Mukai et al.

[11] Patent Number: 5,495,090
[45] Date of Patent: Feb. 27, 1996

[54] WELDING ROBOT

[75] Inventors: Yasushi Mukai; Makoto Takahashi, both of Osaka, Japan

[73] Assignee: Matsushita Electric Industrial Co., Ltd., Osaka, Japan

[21] Appl. No.: 199,169

[22] PCT Filed: Jun. 28, 1993

[86] PCT No.: PCT/JP93/00875

§ 371 Date: Feb. 23, 1994

§ 102(e) Date: Feb. 23, 1994

[87] PCT Pub. No.: WO94/00269

PCT Pub. Date: Jan. 6, 1994

[30] Foreign Application Priority Data

Jun. 29, 1992 [JP] Japan ................................ 4-170402

[51] Int. Cl.⁶ ............................................. B23K 9/127
[52] U.S. Cl. ......................................... 219/124.34; 901/42
[58] Field of Search ........................... 219/124.34, 125.1, 219/130.01, 125.12; 901/42

[56] References Cited

U.S. PATENT DOCUMENTS

| | | | |
|---|---|---|---|
| 4,215,299 | 7/1980 | Edwin et al. | 219/124.34 |
| 4,298,784 | 11/1981 | Schmall | 219/124.02 |
| 4,356,378 | 10/1982 | Cloos et al. | 219/124.1 |
| 4,441,011 | 4/1984 | Nomura et al. | 219/124.34 |
| 4,590,577 | 5/1986 | Nio et al. | |
| 4,704,513 | 11/1987 | Sugitani et al. | 219/125.12 |
| 4,760,241 | 7/1988 | Sugitani et al. | 219/125.12 |

FOREIGN PATENT DOCUMENTS

| | | |
|---|---|---|
| 0320442 | 6/1989 | European Pat. Off. |
| 54-15441 | 2/1979 | Japan |
| 54-55635 | 4/1979 | Japan |
| 56-85106 | 7/1981 | Japan |
| 59-56982 | 4/1984 | Japan |
| 60-136806 | 7/1985 | Japan |
| 64-4875 | 1/1989 | Japan |

*Primary Examiner*—Clifford C. Shaw
*Attorney, Agent, or Firm*—Spencer & Frank

[57] ABSTRACT

A teaching robot including a sensor having a size and a shape which does not deteriorate the accessibility to a workpiece, and carrying out self-teaching of an operation program without execution of actual welding, includes a rotating and sweeping device attached to the distal end of a robot arm, for rotating a noncontact distance sensor; a rotating phase detecting device for detecting rotating phase data; a signal waveform processing device for extracting a feature point from a signal waveform in accordance with distance data to an objective workpiece and rotating phase data; a relationship calculating device for calculating an actual relationship between the objective workpiece and the distal end of the robot arm from feature points extracted from the signal waveform; a relationship setting and storing device for previously setting and storing a reference relationship; and a control device for autonomously moving the robot arm so that the actual relationship calculated by the relationship calculating device coincides with the reference relationship stored in the relationship setting and storing device.

13 Claims, 19 Drawing Sheets

F I G. 4

F I G. 18
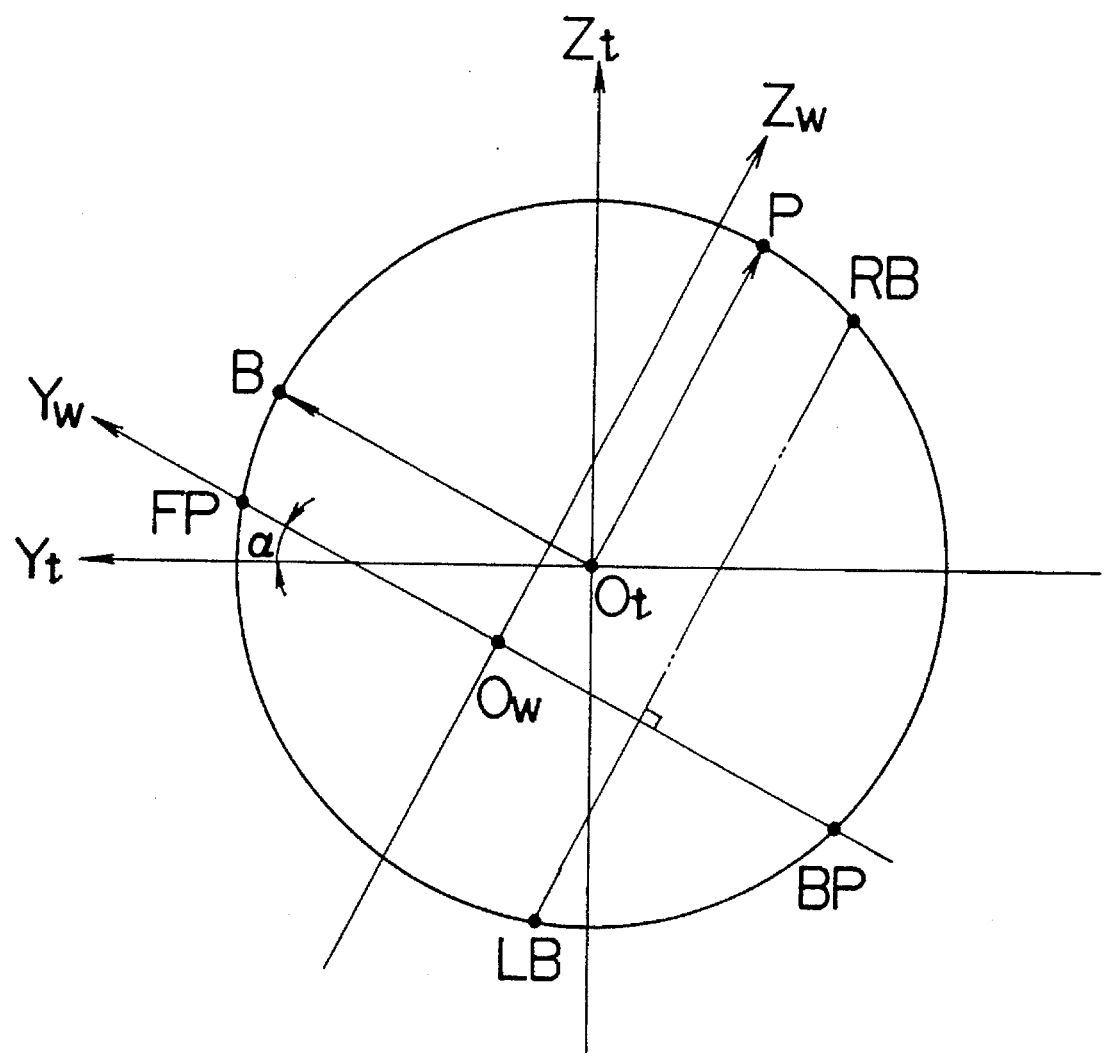

WELDING ROBOT

TECHNICAL FIELD OF THE INVENTION

The present invention relates to a teaching play-back type welding robot which automatically recognizes a welding point on a workpiece to be welded and the posture of the later so as to perform self-teaching of an operation program while it autonomously follows a welding line.

BACKGROUND OF THE INVENTION

Most of presently available welding robots are of a teaching play-back type. These known robots have required that several operation programs be taught to a single robot in order to cope with multi-kind and small quantity production. Further, it has been desired to provide measures for reducing the manhours of effective teaching of an operation program to an welding robot in view of a lack of skilled workers for teaching a robot.

A teaching method which is widely used, in general, at the present time, requires that a teaching worker use manipulating switches in a manipulation box for designating a motion of a robot so as to cause the robot to take a predetermined motion while the teaching worker monitors the motion of the robot in order to teach an operation program. This method presents problems such as requiring a complex teaching operation for a workpiece to be welded which requires a curved welding line, direction change or the like, and further requires repetitions trial operations in order to obtain a desired motion for the robot. Accordingly, it takes a long time for the teaching of the robot.

In view of the above, various teaching measures that don't use a manipulation box as mentioned above, have been proposed, and have been practically used.

Of the above-mentioned measures, one is the so-called off-line teaching method for teaching an absolute position on the coordinates set on a working field including a robot. For example, there have been proposed a method of teaching an absolute position with the use of computer simulation, a method in which a position teaching unit incorporating several light emitting elements, instead of a torch, is moved along a welding line on a workpiece to be welded, and light emitted therefrom is detected by image sensors fixed to a working field so as to teach a robot, as disclosed in Japanese Laid-Open Patent No. 60-136806 or Japanese Patent Publication No. 64-4875. In these methods, a high degree of accuracy is reburied for positioning a robot. Further, the confirmation of the presence of any interference between a robot arm, a welding torch or a welding cable and a workpiece to be welded, a peripheral jig or the like is required.

Further, there are other methods in which teaching is made while a robot is actually operated. A first one of these methods is a direct teaching method in which a robot sometimes detects and stores in memory its motion while a worker who grips a welding torch or a grip part which a dummy of the torch fixed to the distal end part of a robot arm, leads the torch or the like so as to follow a welding line. For example, Japanese Laid-Open Patent No. 56-85106 discloses a method of detecting the motion, in which a force detector for detecting a direction in which the worker leads the grip part and a force for leading the grip part is provided, and the position and posture of the tip end of the torch is computed from an output signal from the detector. Since the direct teaching method allows the worker to manipulate the robot with his institution without being aware of the coordinates set on a robot, it is easily accomplished by the teaching worker. However, the installed force detector may interfere with a workpiece or a jig so that it cannot be manipulated. Further, certain shapes of a workpiece forces the worker to take an unreasonable posture. Further, there is a possible risk such that the worker may accidentally touch the robot and be harmed.

A second method allows a robot to automatically recognize a welding start point and a weld line with the use of a sensor so that the robot teaches while it autonomously follows the welding line. This method can eliminate the necessity of confirmation of the interference and of correction to a teaching point, and eliminate the necessity of teaching which is performed by a worker in close proximity with a robot. Further, since the robot automatically performs positioning and sets a posture with the use of data from the sensor, it is possible to aim at uniforming the quality of teaching without being dependent upon a worker's skill.

Means for automatically recognizing a welding start point and a welding line, is classified mainly into two types. The first type uses a distance sensor or an image sensor utilizing a laser beam, ultrasonic waves or the like, and the second type uses the welding work itself including a welding wire, a welding arc or the like.

In general, most of the means for automatically recognizing a welding start point and a welding line with the use of the distance sensor or the image sensor utilizing a laser beam, ultrasonic waves or the like require additional attachment of the sensor to a robot in the vicinity of a welding torch, and accordingly, the interference between the sensor and a workpiece, a jig or the like may be a hindrance, since a small sized accurate sensor can not be obtained at the present time, and further, affections caused by surface conditions of a workpiece, enviromantal illumination, an ambient temperature or the like are not negligible. Thus, there has been offered such a problem that a workpiece, a jig or a working environment which are applicable are subjected to great restrictions.

As disclosed in Japanese Laid-Open Patent No. 54-15441, a touch sensor using a welding wire as a wire earth is adapted to recognize a position on a workpiece from the position of a robot arm at a time when the welding wire as one of opposite electrodes applied with a voltage and the surface of the workpiece as another one of opposite electrodes make contact with each other so as to obtain an electrical communication during movement of the welding wire by a robot, and with the repetitions of the above-mentioned procedure at several points, the welding line can be detected. However, in this procedure, the detecting action is not so fast since sensing is required at several positions for every teaching point, and accordingly, as the workpiece becomes more complicated a number of teaching points increases, thus requiring longer teaching time. Then presents such a problem that the practical usability thereof is remarkably deteriorated.

Further, as disclosed in Japanese Laid-Open Utility Model No. 54-55635, an arc sensor utilizing a welding arc is of a type that recognizes the position of a welding line with the use of variations in a welding current signal as a data source, that is, variations in welding current caused by variations in the distance between a welding tip and a mother material, which are in turn caused by weaving a welding torch in crossing with the welding line within the bevel of a welding joint, so as to recognize the position of the welding line. However, this method cannot be repeated since the arc itself has to serve as a sensor, so that the teaching must be made during an actual welding operation. Further, there have been offered problems such as the trace of a welding line at a high speed is difficult, practical application to a lap joint of thin plates is inappropriate, the performance of the trace is greatly affected by welding terms, the control of the posture of a torch is difficult and so forth.

The present invention is devised in order to solve the above-mentioned problems, and accordingly, one object of the present invention is to provide a sensor having a size and a shape which do not reduce the accessibility to a workpiece, that is applicable to various workpiece shapes and various working environments, and that is capable of automatically recognizing the position of a welding line and the posture of a torch with respect to a workpiece at a high speed without carrying out a practical welding operation, and to provide a welding robot using the sensor, which can easily carry out a safe and effective teaching method with reduced man hours.

SUMMARY OF THE INVENTION

A welding robot according to the present invention, comprises a robot arm; a first coordinate system set to the distal end part of the robot arm; a second coordinate system set to an objective workpiece; a noncontact distance sensor attached to the distal end part of the robot arm, and adapted to measure a distance to the objective workpiece and to deliver distance data; rotating and sweeping means having its rotary shaft fixed to the first coordinate system, for rotating and sweeping the noncontact distance sensor; rotating phase detecting means for detecting a rotating phase of the noncontact distance sensor and delivering phase data; signal waveform processing means for extracting a feature point in a signal waveform obtained from the distance data and the phase data, and delivering the distance data and the phase data at every feature point; positional relationship calculating means for calculating a positional relationship and a posture relationship (which are hereinbelow denoted simply as "positional relationship") between the first coordinate system and the second coordinate system from data delivered from the signal waveform processing means; a positional relationship setting and storing means for previously setting and storing therein a positional relationship serving as a reference between the first and second coordinate systems; and robot control means for moving the robot arm in such a way that the positional relationship between the first coordinate system and the second coordinate system which is calculated by the positional relationship calculating means coincides with the positional relationship between the first coordinate system and the second coordinate system which is previously set and stored in the positional relationship setting and storing means.

With the above-mentioned arrangement according to the present invention, the noncontact distance sensor is rotated and swept by the rotating and sweeping means, a feature point in a signal waveform is extracted by the signal waveform processing means with the use of distance data to the objective workpiece and rotating phase data, the positional relationship between the first coordinate system and the second coordinate system, that is, the positions of a welding line, the workpiece and a welding torch and the posture of the latter, is calculated from the distance data and the rotating phase data at every thus extracted feature point by the positional relationship calculating means, and the robot arm is moved by the robot control means in such a way that the thus calculated positional relationship coincides with the previously set and stored positional relationship.

Thus, the robot arm can be automatically moved in a desired relationship which is previously set and stored, that is, the welding torch can be set at a desired position and in a desired posture.

Further, with the use of a capacitance type noncontact distance sensor as the above-mentioned noncontact distance sensor, it is possible to provide a small size sensor which can perform detection with a high degree of accuracy with no affection by a surface condition of a workpiece, an environmental illumination, an ambient temperature or the like.

BRIEF DESCRIPTION OF THE DRAWINGS

FIG. 4 is a view for explaining a first coordinate system;

FIG. 18 is a view showing a phase relationship in such a case that the torch coordinate system and the workpiece coordinate system are shifted from each other around the Xt-axis;

DETAILED DESCRIPTION OF THE INVENTION

Detailed explanation will be hereinbelow made of the present invention in reference to the accompanying drawings.

Figure 1:
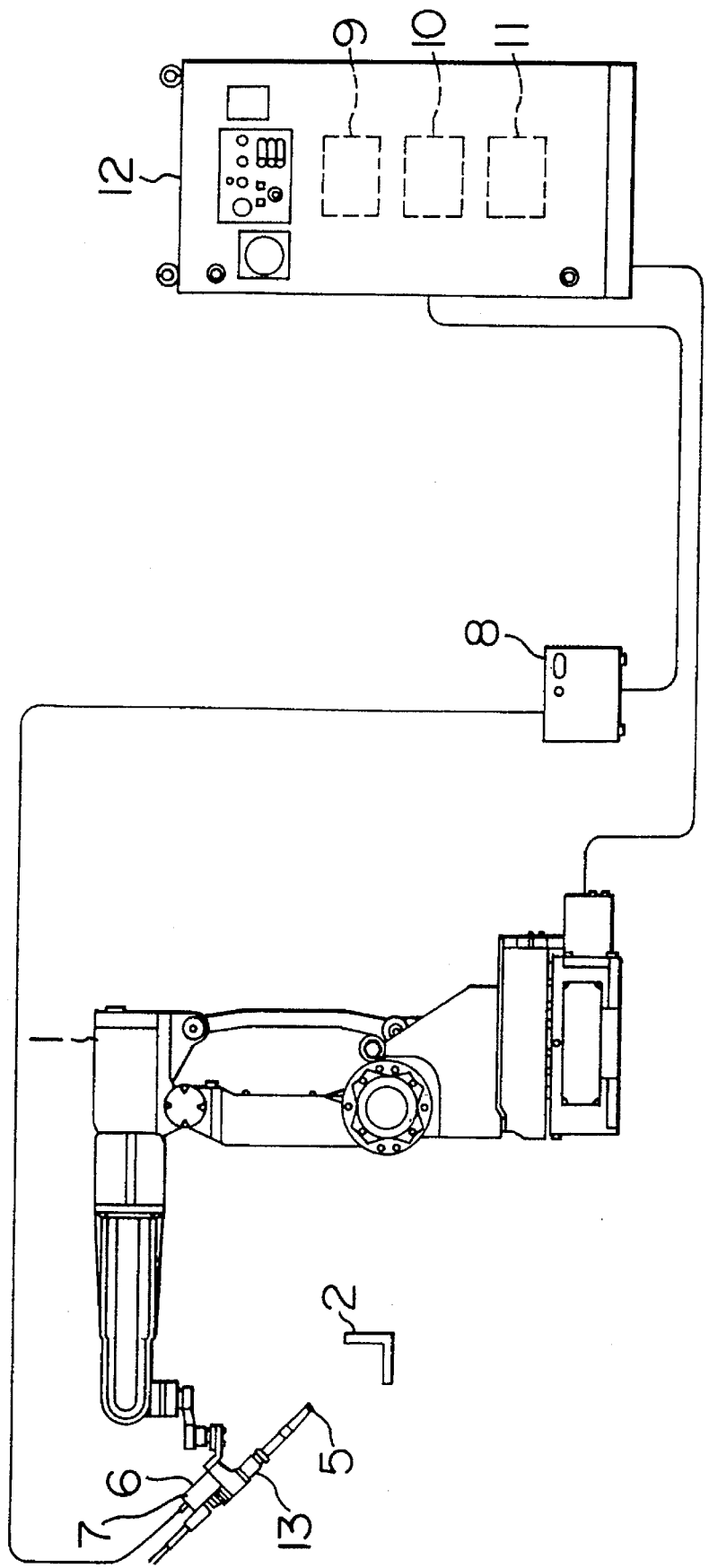
FIG. 1 is an external view illustrating the entire arrangement of the present invention.

Referring to FIG. 1, A vertical multi-joint type robot arm 1 is attached at its distal end with a welding torch (which will be herein denoted as "torch") 13, and a workpiece 2 has a fillet welded joint. A capacitance type noncontact distance sensor (which will be hereinbelow denoted as "capacitance type distance sensor") 5 is attached rotatably to the tip end of the torch 13, eccentric from the center axis (Xt-axis which will be explained later) of the torch 13, and is adapted to be rotated for scanning by a rotating and sweeping means 6 using a servomotor (which is not shown) as a drive source, around the center axis of the torch 13 as a rotational center axis, with a predetermined radius. An encoder for controlling the servomotor serves as a rotating phase detecting means 7 for detecting a rotating phase of the noncontact distance sensor 5, using a Yt-axial direction of a torch coordinate system 3 (FIG. 4) which will be hereinbelow explained, as a reference position. A signal waveform processing means 8 obtains a signal waveform indicating a relationship between a distance and a phase, from an output signal delivered from capacitance type distance sensor 5 and an output signal from the rotating phase detecting means 7, and extracts a feature point from the signal waveform, with data concerning the feature point being delivered to a positional relationship calculating means 9. The positional relationship calculating means 9 calculates a positional relationship between first (torch) and second (workpiece) coordinate systems 3, 4 which will be explained later.

Figure 2:
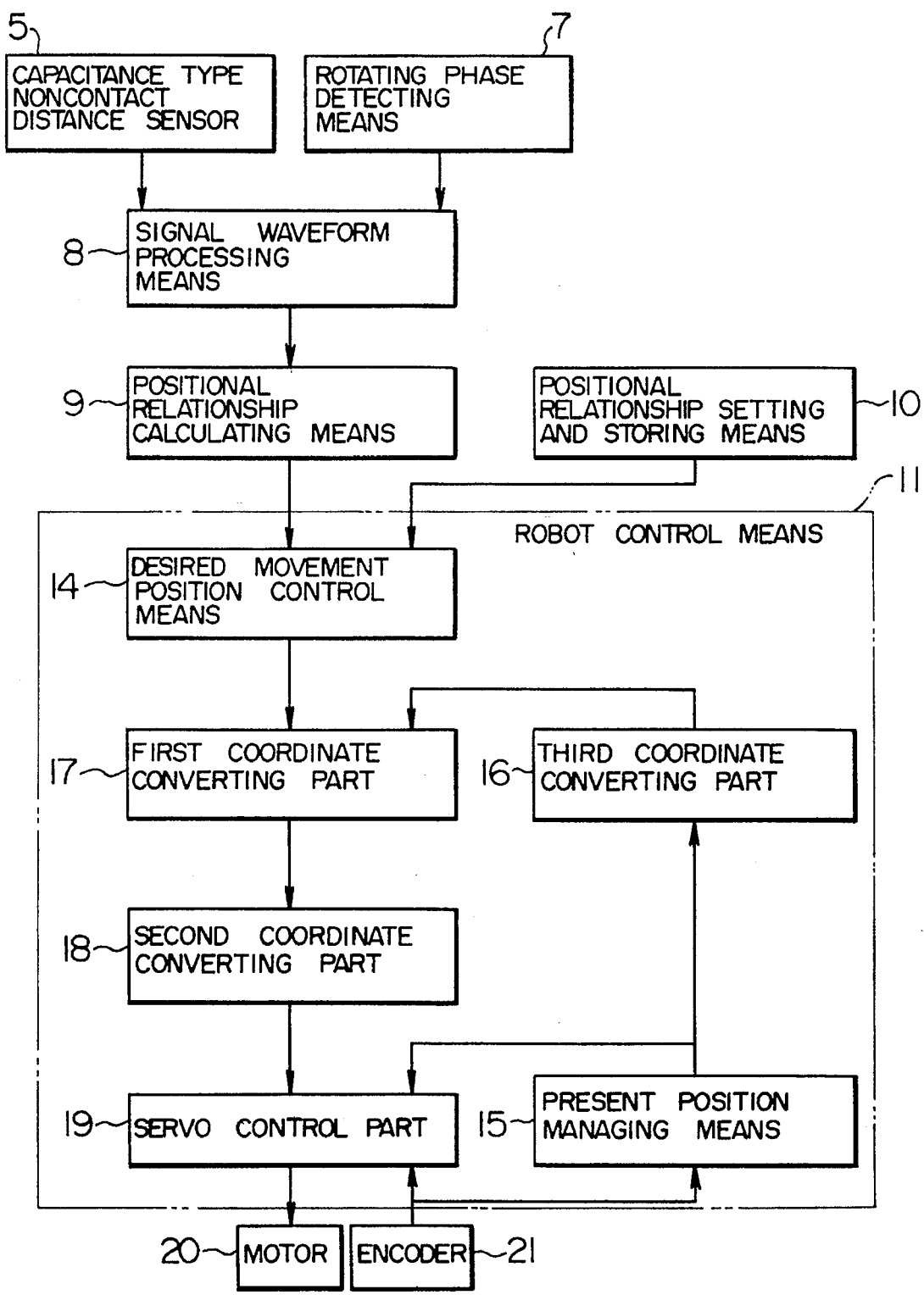
FIG. 2 is a block diagram showing the stream of data in accordance with the present invention.

A positional relationship setting and storing means 10 previously sets and stores therein a desired target position with respect to the workpiece and a posture of the torch as the positional relationship between the first coordinate system 3 and the second coordinate system 4, and accordingly, the robot arm 1 is driven by a robot control means 11 and shaft drive motors 20 attached to the robot arm 1 in such a way that the set and stored positional relationship coincides with the positional relationship calculated by the positional relationship calculating means 9. The robot control means 11 is composed of, as shown in FIG. 2, a desired movement position control means 14, a present position managing means 15, a third coordinate converting part 16, a first coordinate converting part 17, a second coordinate converting means 18, a servo control part 19, and the like, similar to conventional robots, and are incorporated in a robot control device 12 together with the positional relationship calculating means 9 and the positional relationship setting and storing means 10. As shown in FIG. 2, an encoder 21 is attached to a robot arm drive motor 20. It is noted that the motor 20 and the encoder 21 are shown in FIG. 2 for only one axis, and those for the other axes are omitted.

Figure 3:
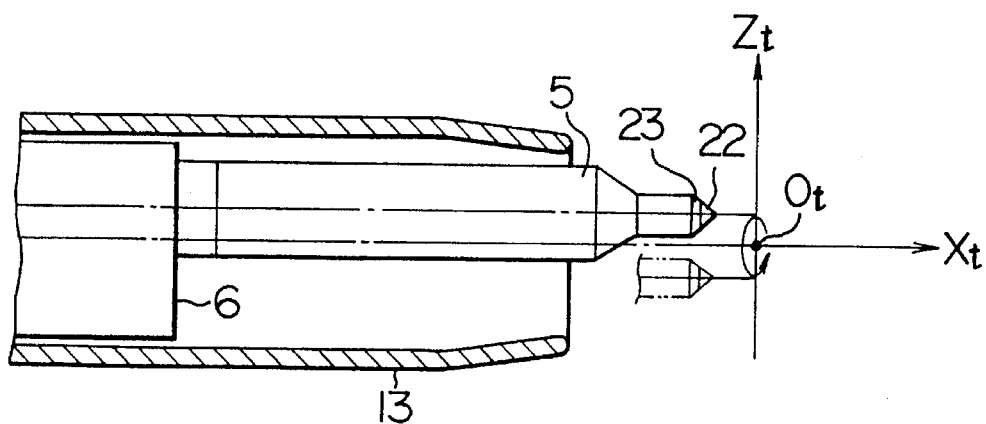
FIG. 3 is a view illustrating a capacitance type two channel distance sensor.

The capacitance type distance sensor 5 in accordance with the present invention, as shown in FIG. 3, has two concentric sensor electrodes 22, 23 which are located at positions spaced from each other by a predetermined distance in the Xt-axial direction which will be explained later, so as to constitute the capacitance type distance sensor 5 having two channels which are operated separately from each other. Since the workpiece 2 has a fillet welded joint, the sensor electrodes are formed in a conical shape in order to enhance the effective electrode area with respect to the diameter of the electrodes. Further, the torch 13 and the capacitance type distance sensor 5 are joined together through the intermediary of a high electrically insulating member, and accordingly, the alignment between the center axis of the welding torch 13 and the rotating center axis of the rotating and sweeping means 6 and the positioning of the capacitance type distance sensor 5 at a reference point can be simply made. Further, it is possible to prevent a shortcircuit of the workpiece 2 which is the other electrode of the capacitance type distance sensor 5, by using a welding cable, a welding wire, a circuit in a welding power source or the like.

Explanation will be hereinbelow made of operation of the welding robot constituted as mentioned above. At first, the coordinate systems serving as the reference for the positional relationship between the torch 13 and the workpiece 2 will be defined with reference to FIGS. 4 and 5.

Figure 4:
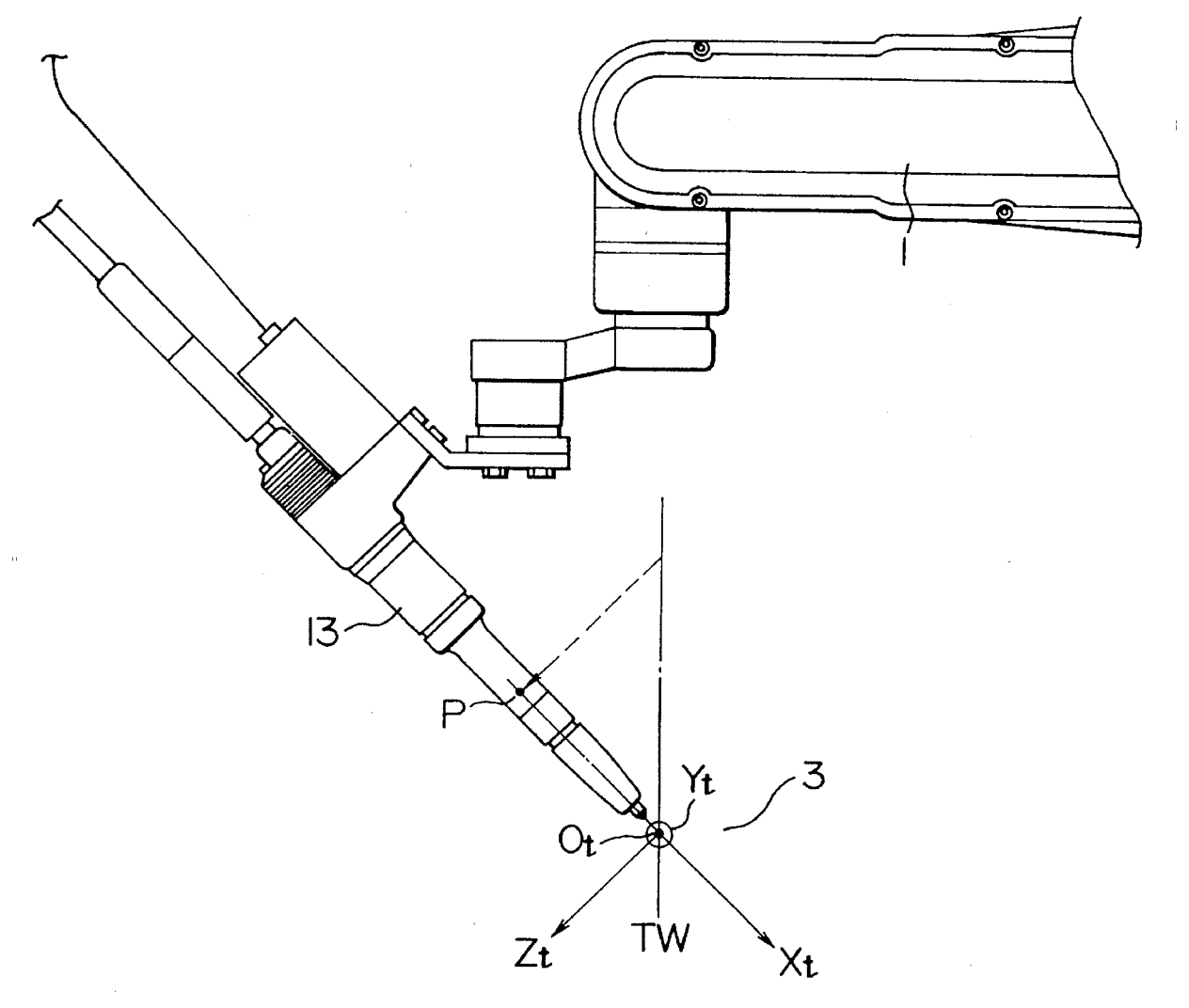

FIG. 4 shows the first coordinate system 3 (which will be hereinbelow denoted as "torch coordinate system") set to the torch that is attached to the robot arm 1. In the first coordinate system 3, an action point at the tip end of the torch 13 is used as a first coordinate system original point Ot (which will be hereinbelow denoted as "torch original point Ot"), and the center axis of the torch 13 is used as the Xt-axis. The positive direction of the Xt-axis is indicated by the arrow in FIG. 4. Further, a line orthogonal to the Xt-axis on a plane including the Xt-axis and the rotating center axis TW of a wrist shaft at the distal end of the robot arm 1 is set as a Zt-axis. The positive direction of the Zt-axis is indicated by the arrow given by a broken line in FIG. 4, which is depicted as a perpendicular extended from the rotating axis TW to a point P set on the torch 13. Further, the direction orthogonal to the Xt and Zt axes, constituting a right-hand system is defined as a Yt-axis.

Figure 5:
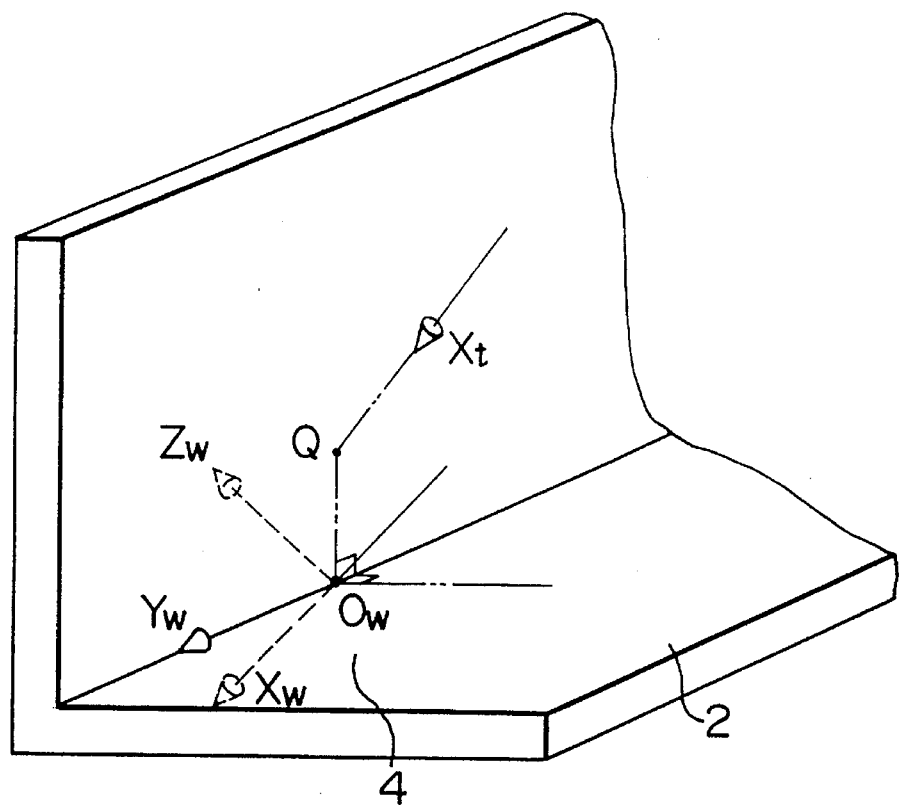
FIG. 5 is a view for explaining a second coordinate system.

Next, FIG. 5 shows the second coordinate system (which will be hereinbelow denoted as "workpiece coordinate system") 4 set on the objective workpiece 2. In a condition in which the robot arm 1 is positioned in the vicinity of a welding line on the workpiece 2, the crossing point between the welding line and a perpendicular extending to the welding line from a point Q at which an extension of the Xt-axis of the above-mentioned torch coordinate system 3 crosses the workpiece, is used as a second coordinate system original point Ow (which will be hereinbelow denoted as "workpiece original point Ow). The direction of the welding line from the original point Ow is used as a Yw-axis, and the direction bisecting the bevel angle of the workpiece, orthogonal to the Yw is used as an Xw-axis. In this phase, the positive direction of the Yw-axis can be taken in either direction, but the positive direction of the Xw-axis is set so as to extend from the workpiece original point to the rear surface of the workpiece 2. The remaining Zw-axis is orthogonal to the Xw- and Yw-axes, and extends in a direction constituting a right-hand system.

At first, the capacitance type distance sensor 5 uses the fact that the capacitance between two electrodes is inverse-proportional to the distance between opposed electrodes, and an electrode incorporated in the sensor is used as one of opposed electrodes while an object to be measured itself is used as the other electrode, between which a potential difference is given so as to constitute a circuit for measuring the capacitance between the opposing electrodes. Thus, it is possible to indirectly set the distance between the opposed electrodes or the distance between the capacitance type distance sensor 5 and the workpiece 2.

The distance data measured by the capacitance type distance sensor 5 and the phase data obtained from the rotating phase detecting means 7 are delivered to the signal waveform processing means 8 so as to be processed into distance data and phase data for every feature point, which are then delivered to the positional relationship calculating means 9 for calculating the positional relationship between the torch coordinate system 3 and the workpiece coordinate system 4. The operation of the signal waveform processing means 8 and the positional relationship calculating means 9 will be detailed later.

The positional relationship calculated by the positional relationship calculating means 9 is delivered to the desired movement position control means 14 together with the reference positional relationship previously stored in the positional relationship setting and storing means 10 so as to calculate a desired movement position indicated in the torch coordinate system 3 in order to make the calculated positional relationship equal to the previously set and stored reference positional relationship. The desired movement position indicated in the torch coordinate system 3 is delivered to the first coordinate converting part 17 together with the present position of the first coordinate system 3 indicated by an orthogonal coordinate system calculated by the third coordinate converting part 16, with the use of the present axis positions stored in the present position managing means 15, and is converted into a desired movement position indicated in the orthogonal coordinate system. Then, it is delivered to the second coordinate converting part 18 so as to be further converted into a desired movement position indicated in a joint coordinate system. This desired movement position indicated in the joint coordinate system is delivered to the servo control part 19 for controlling the robot arm 1, in relation to the axes, simultaneously.

That is, the desired movement position is compared with the present axis position data from the above-mentioned present position managing means 15, and motor rotating instructions are delivered to the motor 20 incorporated in the robot arm 1. The encoder 21 attached to the motor 20 delivers feed-back data to the servo control part 19 so as to constitute a servo system, and is also delivered to the present position managing means 15 so as to be used for updating the present position.

Explanation will be hereinbelow made of a specific method of calculating the positional relationship between the torch coordinate system 3 and the workpiece coordinate system 4 with the use of the signal waveform processing means 8 and the positional relationship calculating means 9, with reference to the drawings.

Figure 6:
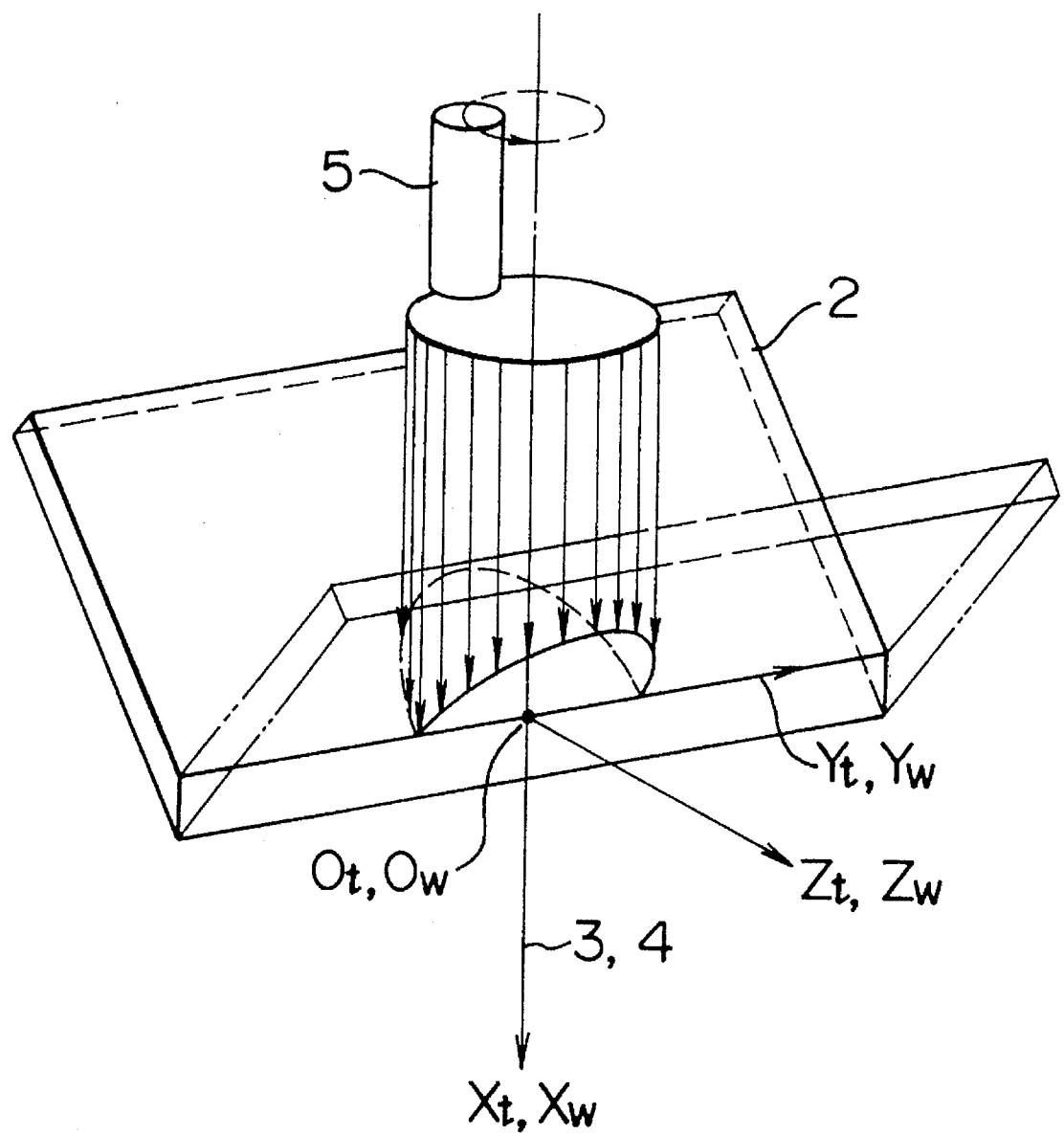
FIG. 6 is a typical view showing such a case that a torch coordinate system coincides with a workpiece coordinate system.
Figure 7:
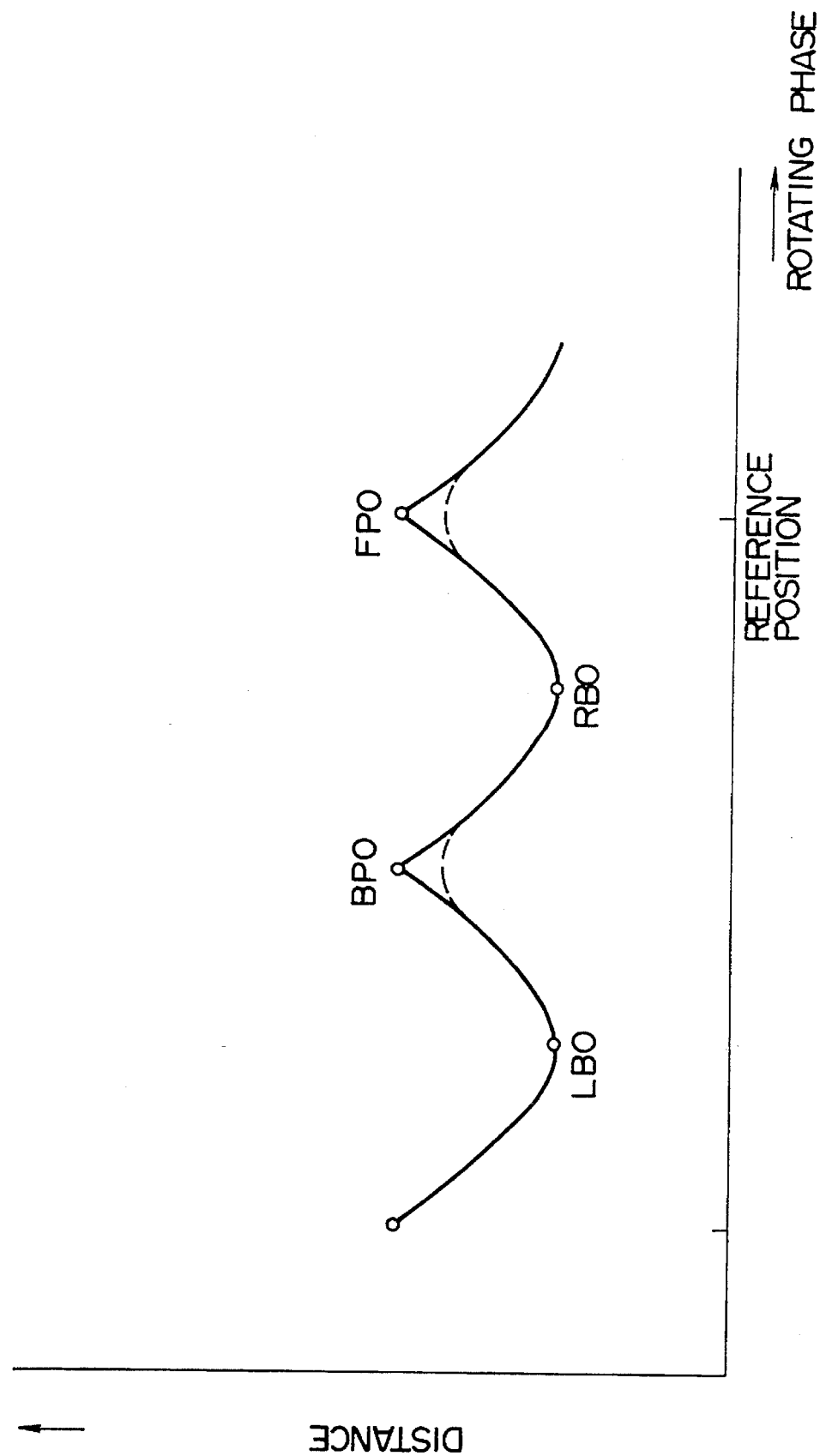
FIG. 7 is a view showing a waveform of a sensor signal in such a case that the torch coordinate system coincides with the workpiece coordinate system.

First, FIG. 6 is a typical view showing such a case that the torch coordinate system 3 coincides with the workpiece coordinate system 4. Referring to FIG. 6, the capacitance type distance sensor 5 measures the distance to the workpiece in the Xt-axial direction, that is, successively measures the lengths of several arrows parallel with the Xt-axis as shown in the figure while the capacitance type distance sensor 5 is rotated around the Xt-axis as a rotating center axis by the rotating and sweeping means 6 (which is not shown in FIG. 6), counterclockwise as indicated by the arrow given by the broken line. During this period, the rotational phase of the capacitance type distance sensor 5 can be simultaneously detected by the rotating phase detecting means 7, and accordingly, a signal waveform shown by a solid line in FIG. 7 is obtained. The ordinate exhibits the distance to the workpiece 2 measured by the capacitance type distance sensor, and the abscissa exhibits the rotating phase during measurement.

As shown in FIG. 7, the signal waveform indicating the relationship between the rotating phase and the distance theoretically exhibits such a shape that a sinusoidal wave is folded back at every other half-cycle. However, since the capacitance type distance sensor 5 measures an averaged distance obtained from the total value of capacitances between the object to be measured (workpiece 2) and the sensor electrode, and views the workpiece as not a point but a surface, the signal waveform actually obtained resembles a sinusoidal wave having two cycle periods per one revolution and having no points of discontinuity as indicated by a broken line in FIG. 7. However, unless otherwise specified, explanation will be made with the use of the theoretical signal waveform indicated by the solid line in FIG. 7 in the following description.

The signal waveform varies depending upon the positional relationship between the torch coordinate system 3 and the workpiece coordinate system 4, and accordingly, the positional relationship between the torch coordinate system 3 and the workpiece coordinate system 4 can be known by detecting the variation in the signal waveform.

It is convenient for knowing the variation in the signal waveform to use a method in which a feature point is extracted from the signal waveform, and then the variation in the signal waveform, that is, the positional relationship between the torch coordinate system 3 and the workpiece coordinate system 4 is analyzed from data per every feature point. In particular, since it can be processed at a high speed with the use of an extreme point in the signal waveform, an extreme point in the waveform as shown in FIG. 7 is extracted from the signal waveform processing means 8, and the positional relationship between the torch coordinate system 3 and the workpiece coordinate system 4 is calculated from data concerning the thus obtained extreme point in the waveform, by the positional relationship calculating means 9.

It is natural that the signal waveform contains noise, and accordingly, when the difference between the values of the successive two extreme points is less than a predetermined value, and the difference between the phases at the two extreme points is less that a predetermined value, these extreme points are not extracted as feature points in order to prevent extreme points from being erroneously extracted by noise. Further, as mentioned above, since the capacitance type distance sensor is used, a point of discontinuity is not inherently present in the signal waveform, and accordingly, if the extreme point is a point of discontinuity, the point is considered as noise, and is therefore excluded.

As clearly shown in FIG. 6, of extreme points, local minimum points are located at positions at which the left and right inner surfaces of the joint of the workpiece 2 cross the Xt-Zt plane. These left and right local minimum points are denoted as LB, RB, respectively (if the two coordinate systems coincide with each other as shown in FIG. 7, these points are denoted as LB0, RB0, respectively). Further, local maximum points are located front and back on the welding line on the workpiece 2 in the advance direction, and these front and back local maximum points are denoted as FP, BP (they are denoted as FP0, BP0 in FIG. 7).

From FIG. 7, if the torch coordinate system 3 and the workpiece coordinate system 4 coincide with each other, the local minimum points RB0, LB0, and the local maximum points FP0, BP0 have equal values, respectively, and the phases at these four extreme points divide one revolution into four equal parts. Further, since the reference position of the rotating phase is set in the positive direction of the Yt-axis, the phase of the point FP0 coincides with the reference position of the phase.

Figure 8:
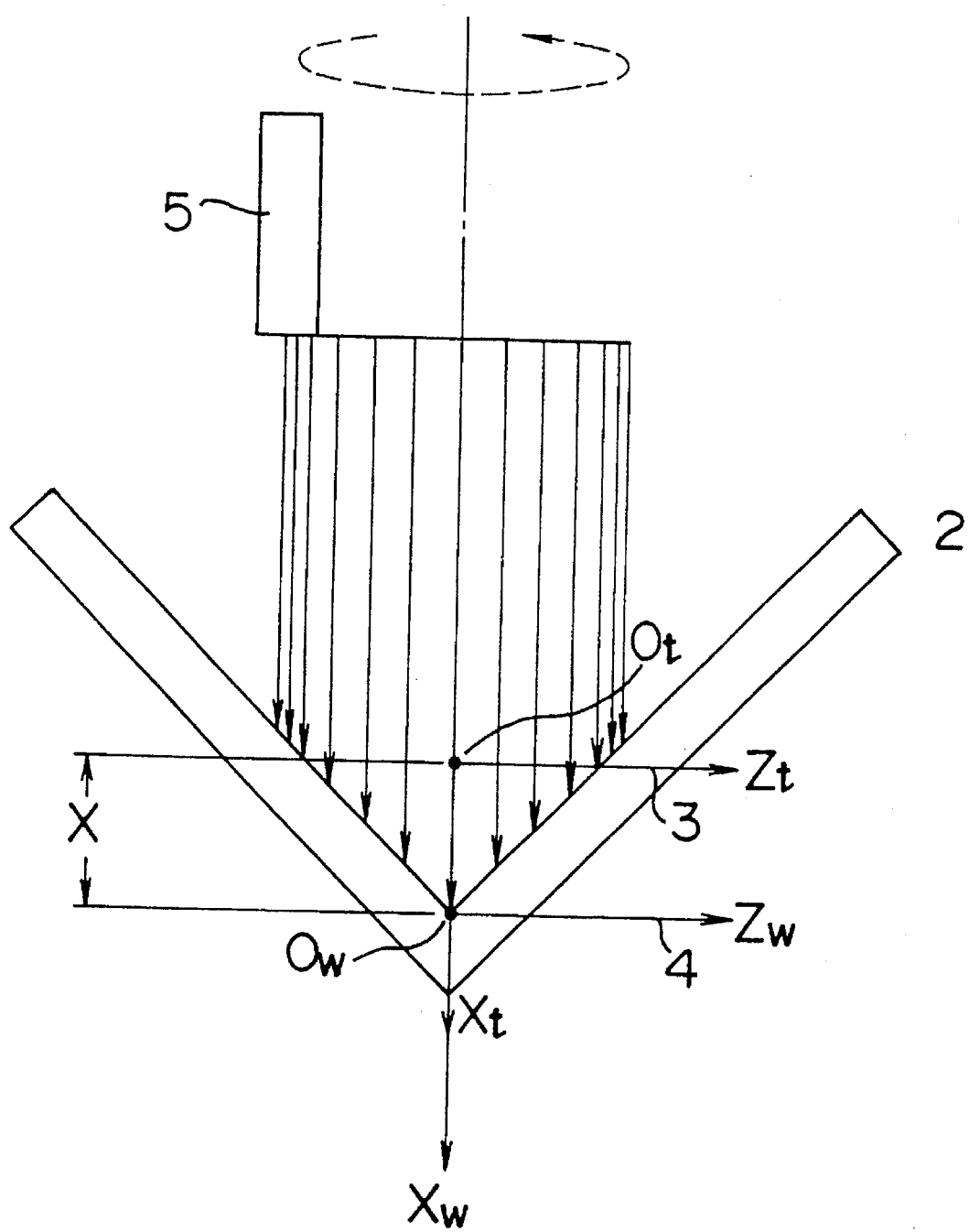
FIG. 8 is a typical view showing such a case that the torch coordinate system and the workpiece coordinate system are shifted from each other in the direction of an Xt-axis.

Next, FIG. 8 shows a condition such that the torch coordinate system 3 and the workpiece coordinate system 4 are shifted from each other by a distance X in the Xt-axial direction, and further, FIG. 8 is a view obtained by observing the typical view shown in FIG. 6 in the Yw-axial direction. Further, a signal waveform obtained in this condition is indicated by a solid line in FIG. 9. Extreme points obtained in this condition are denoted as FP1, BP1, RB1, LB1. Further, a waveform indicated by a broken line in FIG. 9 is the waveform as shown in FIG. 7 in such a case that the torch coordinate system 3 and the workpiece coordinate system 4 coincide with each other.

Figure 9:
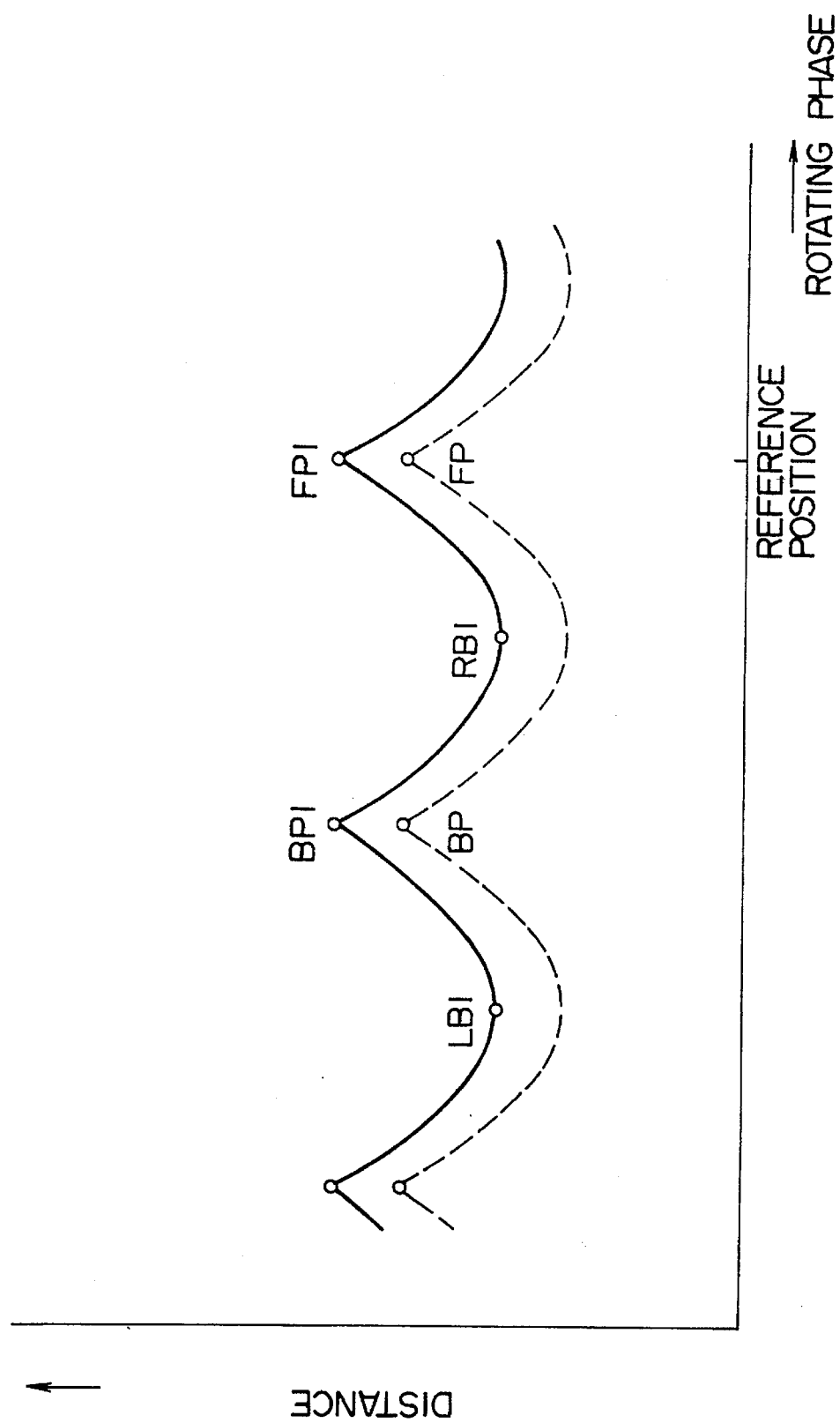
FIG. 9 is a view showing a waveform of a sensor signal in such a case that the torch coordinate system and the workpiece coordinate system are shifted from each other in the direction of the Xt-axis.

As clearly understood from FIG. 9, since the waveform is vertically shifted in its entirety, if the torch coordinate system 3 and the workpiece coordinate system 4 are shifted from each other in the Xt-axial direction, the positional relationship between the torch coordinate system 3 and the workpiece coordinate system 4 can be calculated by comparing the averaged value of the points FP1, BP1 which are local maximum points in the waveform, with the averaged value of the points FP0, BP0 in such a case that the torch coordinate system 3 coincides with the workpiece coordinate system 4.

Figure 10:
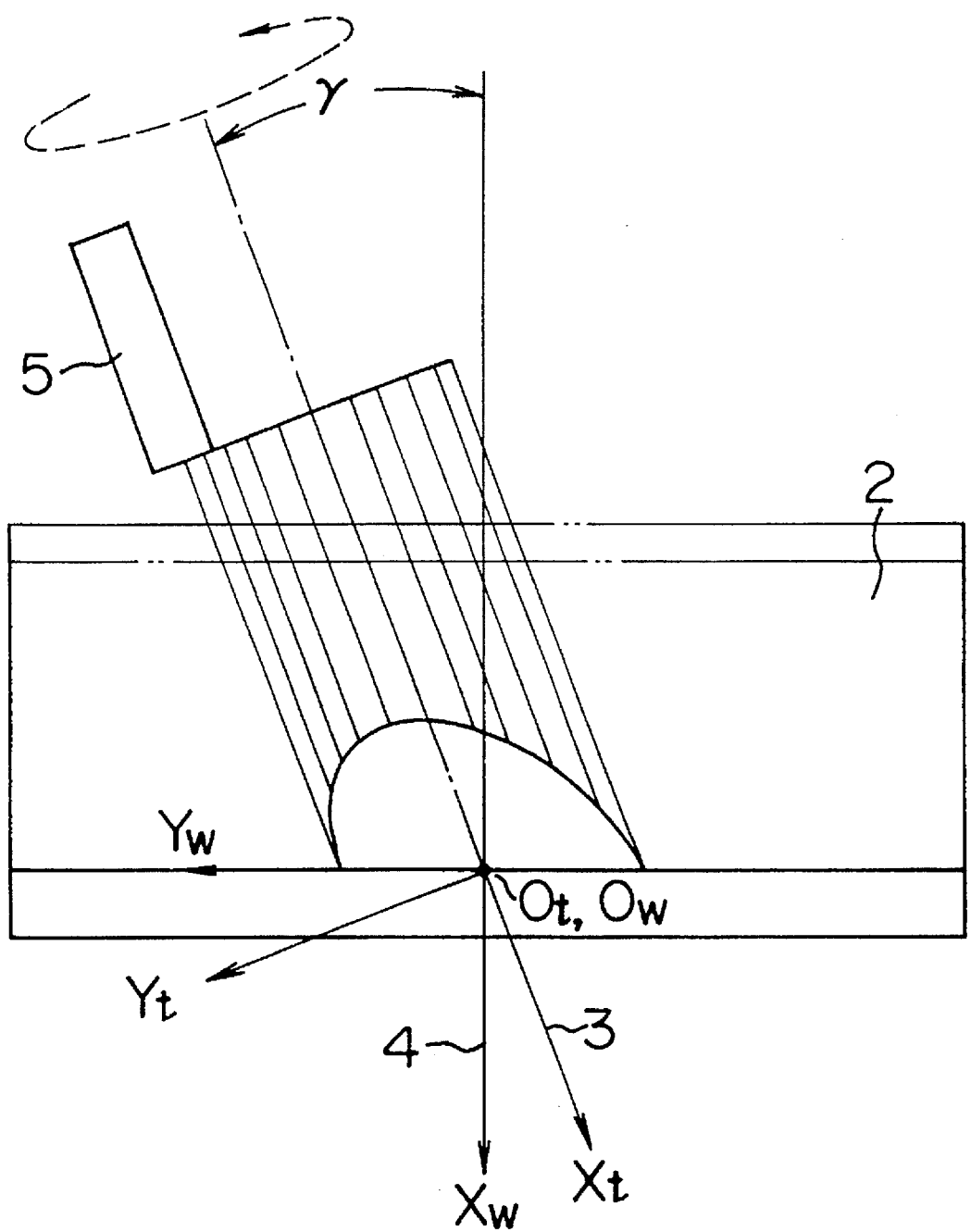
FIG. 10 is a typical view showing such a case that the torch coordinate system and the workpiece coordinate system are shifted from each other around a Zt-axis.

FIG. 10 shows in such a condition that the torch coordinate system 3 and the workpiece coordinate system 4 are shifted from each other around the Zt-axis by an angle γ (that is, inclined). FIG. 10 is obtained by observing the typical view given by FIG. 6 in the Zw-axial direction. A signal waveform obtained in this condition is indicated by a solid line in FIG. 11. Extreme points in this condition are denoted as FP2, BP2, RB2, LB2, respectively. Further, a waveform indicated by a broken line in FIG. 11 is the waveform as shown in FIG. 7 in such a case that the torch coordinate system 3 coincides with the workpiece coordinate system 4.

Figure 11:
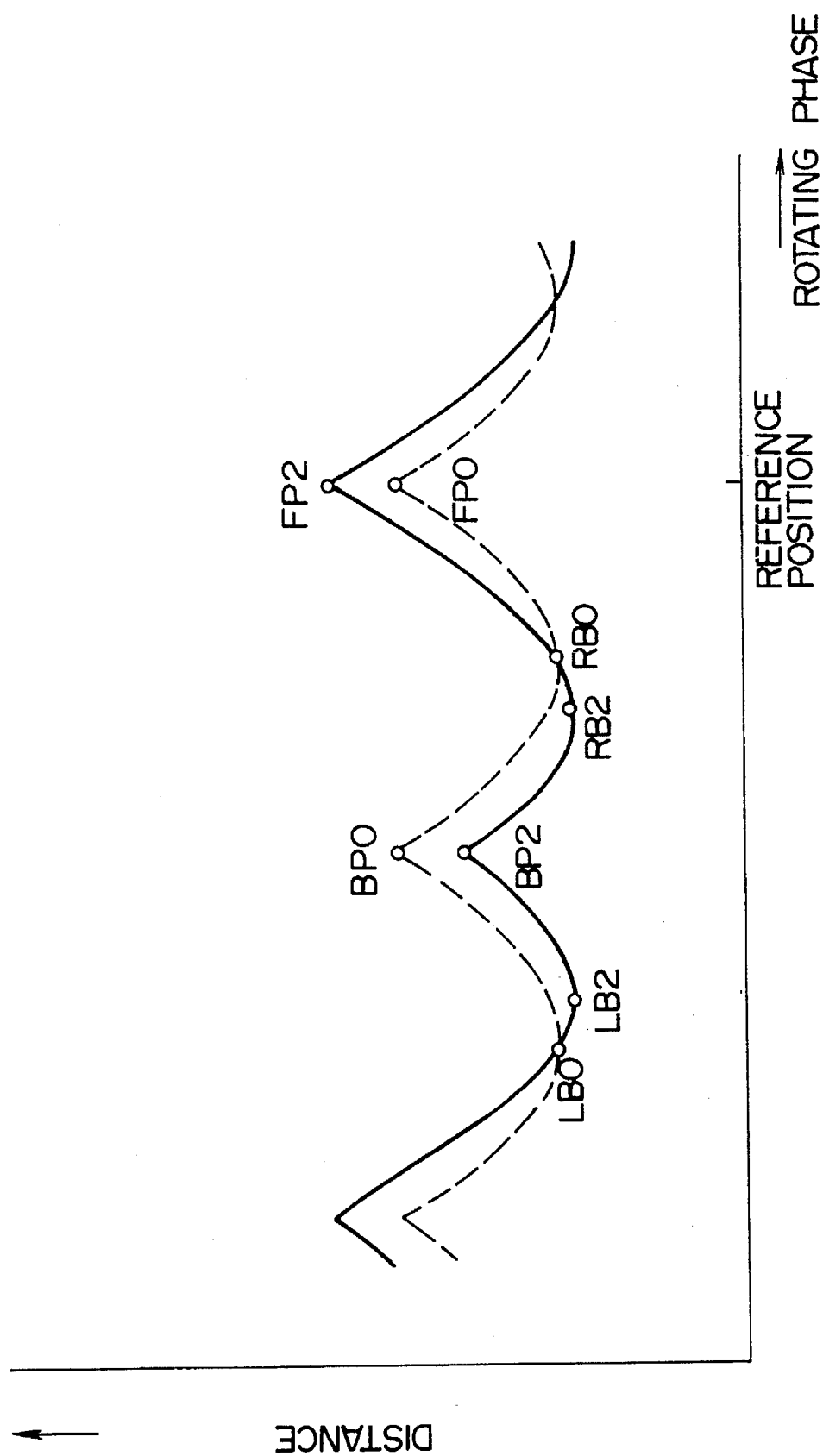
FIG. 11 is a view showing a waveform of a sensor signal in such a case that the torch coordinate system and the workpiece coordinate system are shifted from each other around the Zt-axis.

As clearly understood from FIG. 11, if the torch coordinate system 3 and the workpiece coordinate system 4 are shifted from each other around the Zt-axis, a difference between the points FP2, BP2 which are the extreme points in the waveform is present. Since the radius of the rotating scanning is already known, the positional relationship between the torch coordinate system 3 and the workpiece coordinate system 4 around the Zt-axis can be calculated from the difference between the points FP2, BP2 and the rotating radius.

Figure 12:
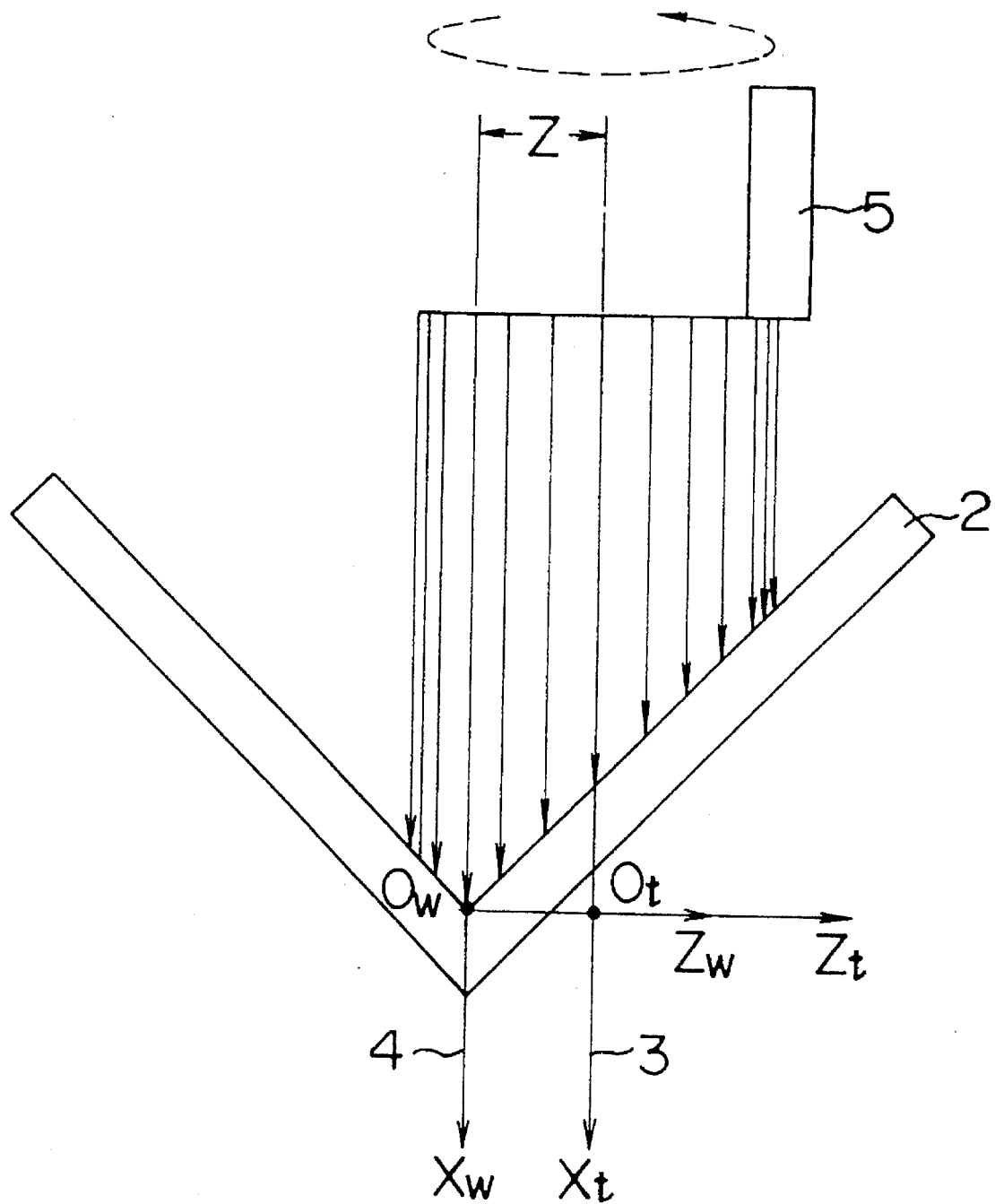
FIG. 12 is a typical view showing such a case that the torch coordinate system and the workpiece coordinate system are shifted from each other in the direction of the Zt-axis.

FIG. 12 shows such a condition that the torch coordinate system 3 and the workpiece coordinate system 4 are shifted from each other by a distance Z in the Zt-axial direction. FIG. 12 is obtained by observing the typical view given by FIG. 6 in the Yw-axial direction, similar to FIG. 8, and a signal waveform obtained in this condition is indicated by a solid line in FIG. 13. Extreme points obtained in this condition are denoted as FP3, BP3, RB3, LB3, respectively.

Figure 13:
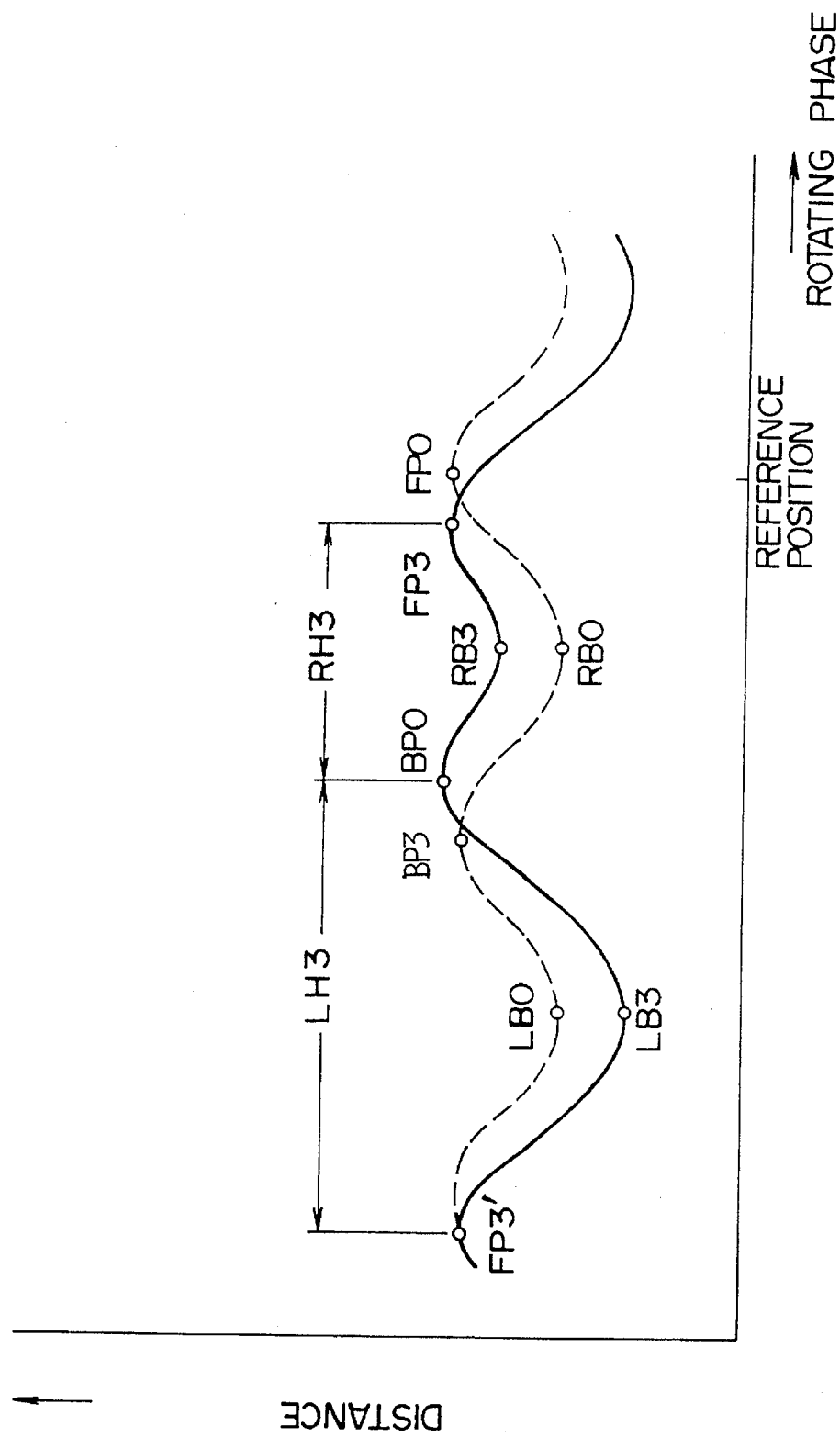
FIG. 13 is a view showing a waveform of a sensor signal in such a case that the torch coordinate system and the workpiece coordinate system are shifted from each in the direction of the Zt-axis.

It is noted that the signal waveform shown in FIG. 13 is that obtained by actual measurement with the use of the capacitance type distance sensor 5, and a waveform indicted by a broken line is a signal waveform in such a case that the torch coordinate system 3 coincides with the workpiece coordinate system 4, and which are similarly obtained by actual measurement with the use of the capacitance type distance sensor 5.

As clearly understood from FIG. 13, if the torch coordinate system 3 and the workpiece coordinate system 4 are shifted from each other in the Zt-axial direction, a difference is present between the values of the local minimum points LB3, RB3 at the left and right surfaces of the workpiece 2, and also a difference is present between the phase with which the right inner surface is scanned, that is, the difference RH3 between the phase value of the local maxium point FP3 and the phase value of the local maximum point BP3, and the phase with which the left inner surface is scanned, that is, the difference LH3 between the phase value of the local maximum point FP3' and the phase value of the local maximum point BP3. It is noted that the local maximum point FP3' is obtained by measuring the position the same as that of the local maximum point FP3 one revolution before.

As mentioned above, although the shift between the torch coordinate system 3 and the workpiece coordinate system 4 in the Zt-axial direction can be calculated with the use of either the difference between two local minimum points or the difference in phase between two local maximum points, as mentioned above, since no points of discontinuity are present at the local maximum points in the actual signal waveform measured by the capacitance type distance sensor 5 as shown in FIG. 13, the detection accuracy is inferior in the calculation method using the phase. According to the present invention, the positional relationship between the torch coordinate system 3 and the workpiece coordinate system 4 in the Zt-axial direction is calculated with the use of the difference between the values of the local minimum points RB3, LB3.

Figure 14:
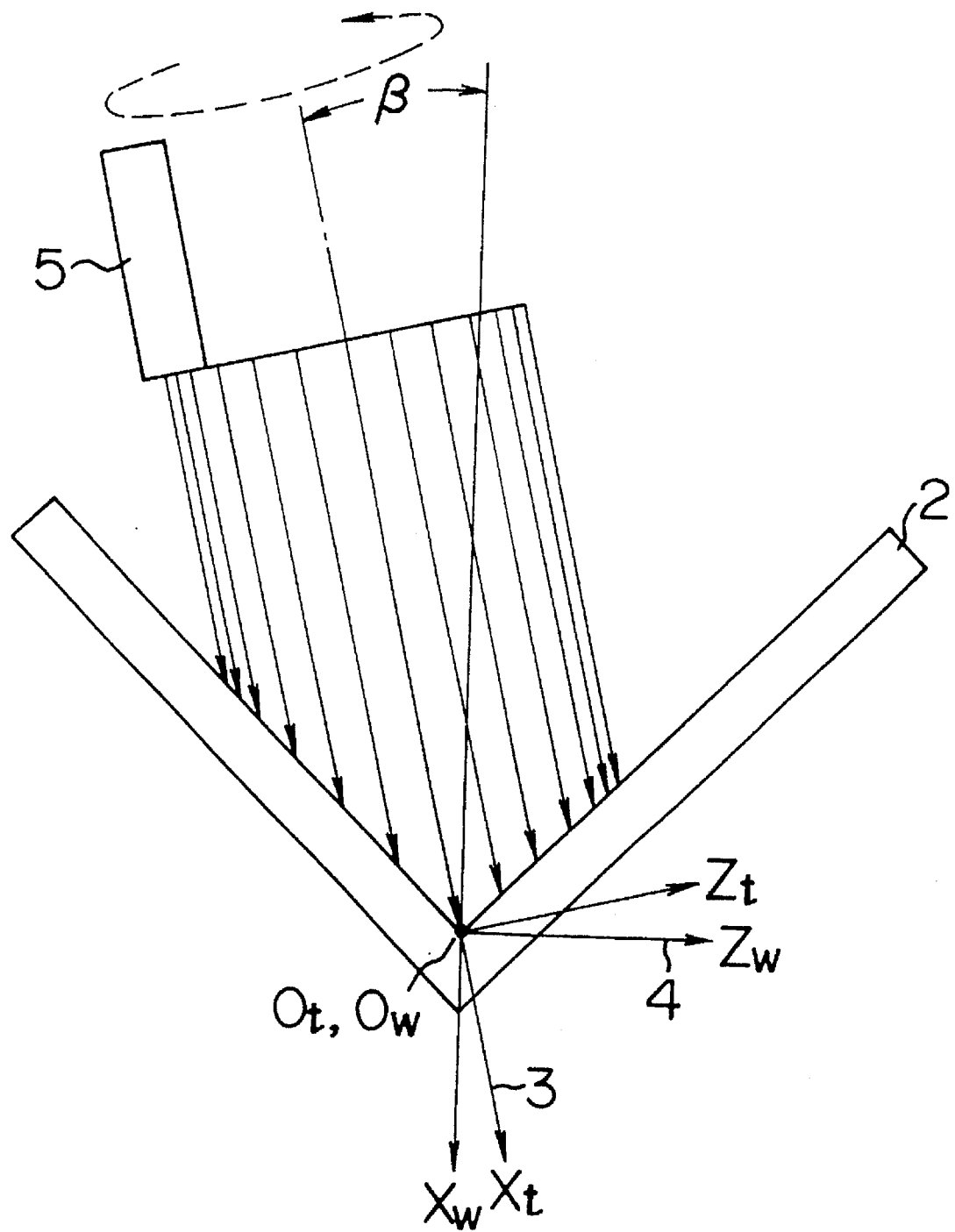
FIG. 14 is a typical view showing such a case that the torch coordinate system and the workpiece coordinate system are shifted from each other around a Yt-axis.

FIG. 14 shows such a condition that the torch coordinate system 3 and the workpiece coordinate system 4 are shifted from each other around the Yt-axis by an angle β (or inclined).

FIG. 14 is obtained by observing the typical view given by FIG. 6 in the Yt-axial direction, similar to FIGS. 8 and 10.

Figure 15:
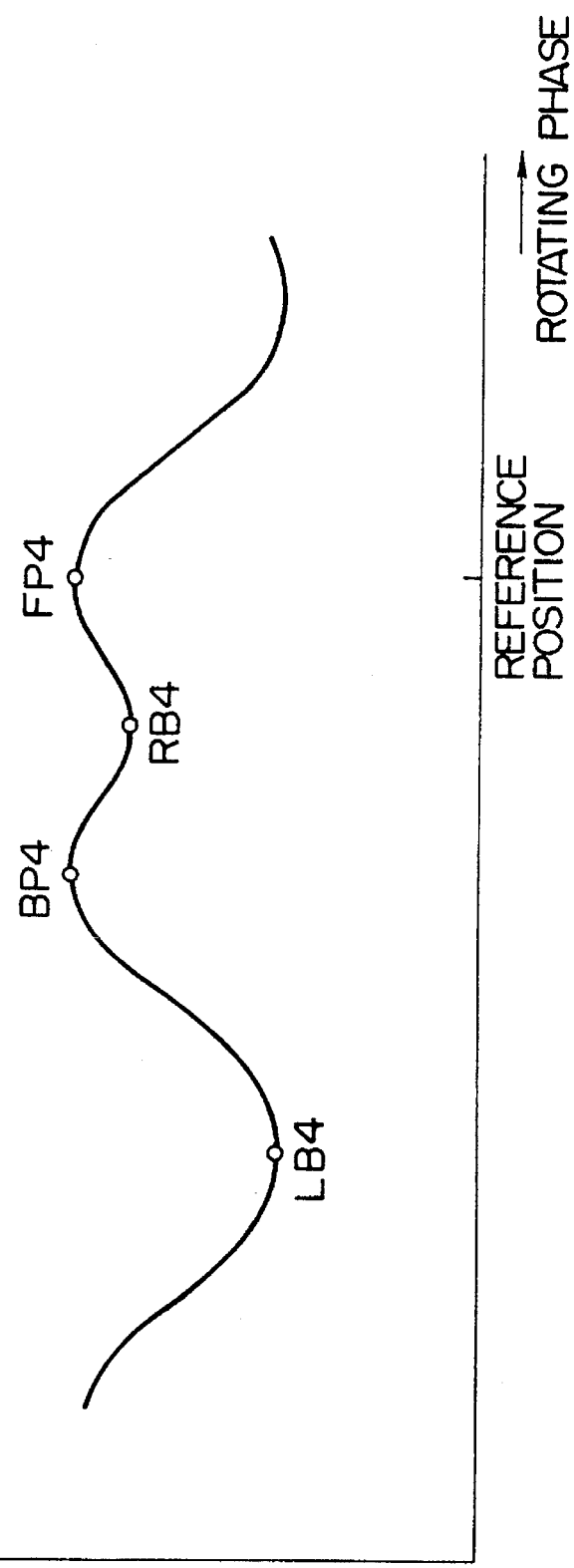
FIG. 15 is a view showing a waveform of a sensor signal in such a case that the torch coordinate system and the workpiece coordinate system are shifted from each other around the Yt-axis.

A signal waveform obtained in this condition is indicated by a solid line in FIG. 15. Extreme points obtained in this condition are denoted as FP4, BP4, RB4, LB4, respectively.

It is noted that the signal waveform shown in FIG. 15 is also obtained by actual measurement with the use of the capacitance type distance sensor 5, similar to that shown in FIG. 13.

The results of calculation of the positional relationships explained above, can be obtained similarly with the use of either one of the two channels of the capacitance type distance sensor 5. However, as clear from the comparison between FIG. 15 and FIG. 13, the similar waveforms can be obtained in such a case that the torch coordinate system 3 and the workpiece coordinate system 5 are shifted from each other around the Yt-axis by an angle β, and in such a case that the torch coordinate system 3 and the workpiece coordinate system 4 are shifted from each other around the Zt-axial direction by a distance Z. Accordingly, in this situation, the discrimination between such a case that the torch coordinate system 3 and the workpiece coordinate system 4 are shifted from each other around the Yt-axis and such a case that both systems 3, 4 are shifted from each other in the Zt-axial direction cannot be made. In order to discriminate these two cases from each other, the two channels of the capacitance type distance sensor 5 are used.

Figure 16:
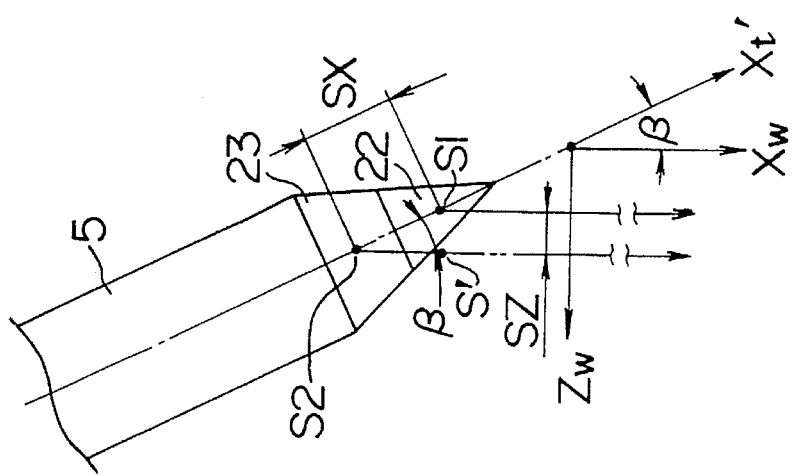
FIG. 16(A) is a typical view showing such a case that the capacitance type two channel distance sensor is used, and that the torch coordinate system and the workpiece coordinate system are shifted from each other around the Yt-axis.
FIG. 16(B) is an enlarged view illustrating a part of the capacitance type distance sensor shown in FIG. 6(A) in the vicinity of the front end thereof.
Figure 16:
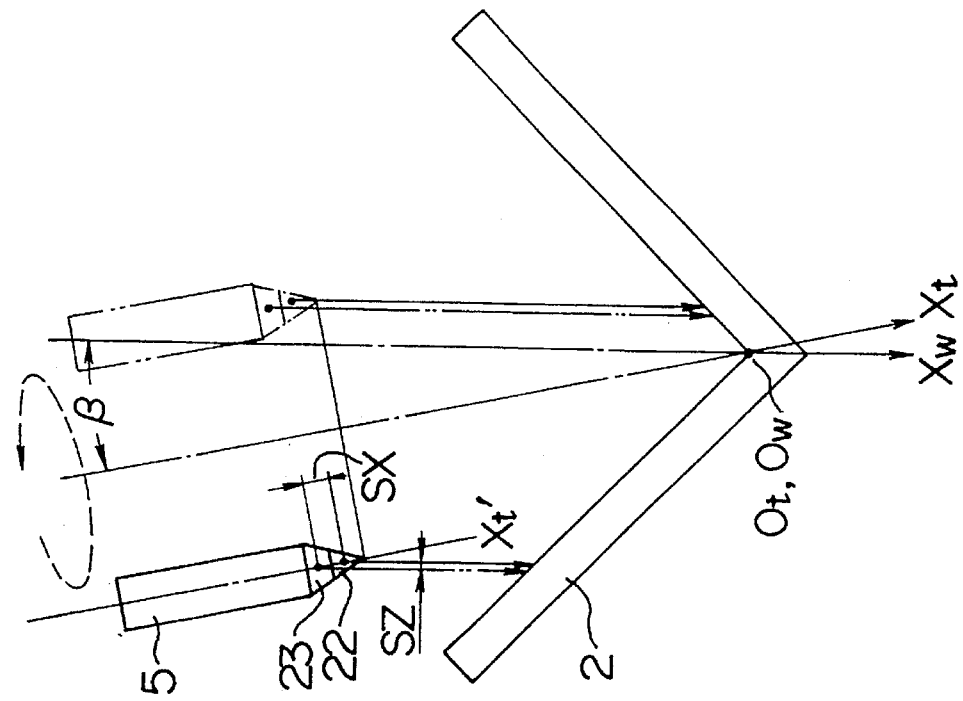

FIGS. 16(A) and (B) are views for explaining a calculation method for such a case that the torch coordinate system 3 and the workpiece coordinate system 4 are inclined around the Yt-axis by an angle 9, using this two channel capacitance type distance sensor 5. As mentioned above, since the capacitance type distance sensor 5 obtains a distance from the total value of capacitances between the object to be measured and the sensor electrode, the actual measured distance is a distance in the Xw-axial direction, and accordingly, the two channels of the capacitance type distance sensor 5 measure the distances between an arrow indicated by a solid line and an arrow indicated by a broken line in the figure, respectively.

The distance SZ between the solid line arrow and the broken line allow in the Zw-axial direction varies in dependence upon the angle β as clear from FIGS. 6(A) and (B), and therefore can be obtained in such a way that the capacitance type distance sensor 5 is rotated and swept, and shifts in the Zt-axial direction are calculated respectively for the two channels so as to take a difference between the respective results of the calculation.

FIG. 16(B) is an enlarged view illustrating the electrode part of the capacitance type distance sensor 5 shown in FIG. 16(A). Referring to FIG. 16(B), the first electrode 22 and the second electrode 23 measure the distance from points S1, S2 to the workpiece 2 as shown in the figure, these points S1, S2 being spaced from each other by a distance SX in an Xt'-axial direction which is parallel with the Xt-axis. When the cross point between a straight line which is drawn from the point S1 in the Xt'-axial direction, and the broken line arrow which indicates the distance measured by the second electrode 23 is denoted as S', the angle β, that is, the positional relationship between the torch coordinate system 3 and the workpiece coordinate system 4 around the Yt-axis (that is, the inclination of the capacitance type distance sensor 5) can be obtained by calculating the inverse sine function of the division of SX by SZ since an angle S1, S2, S' of the right angle triangular S1, S2, S' is β.

Figure 17:
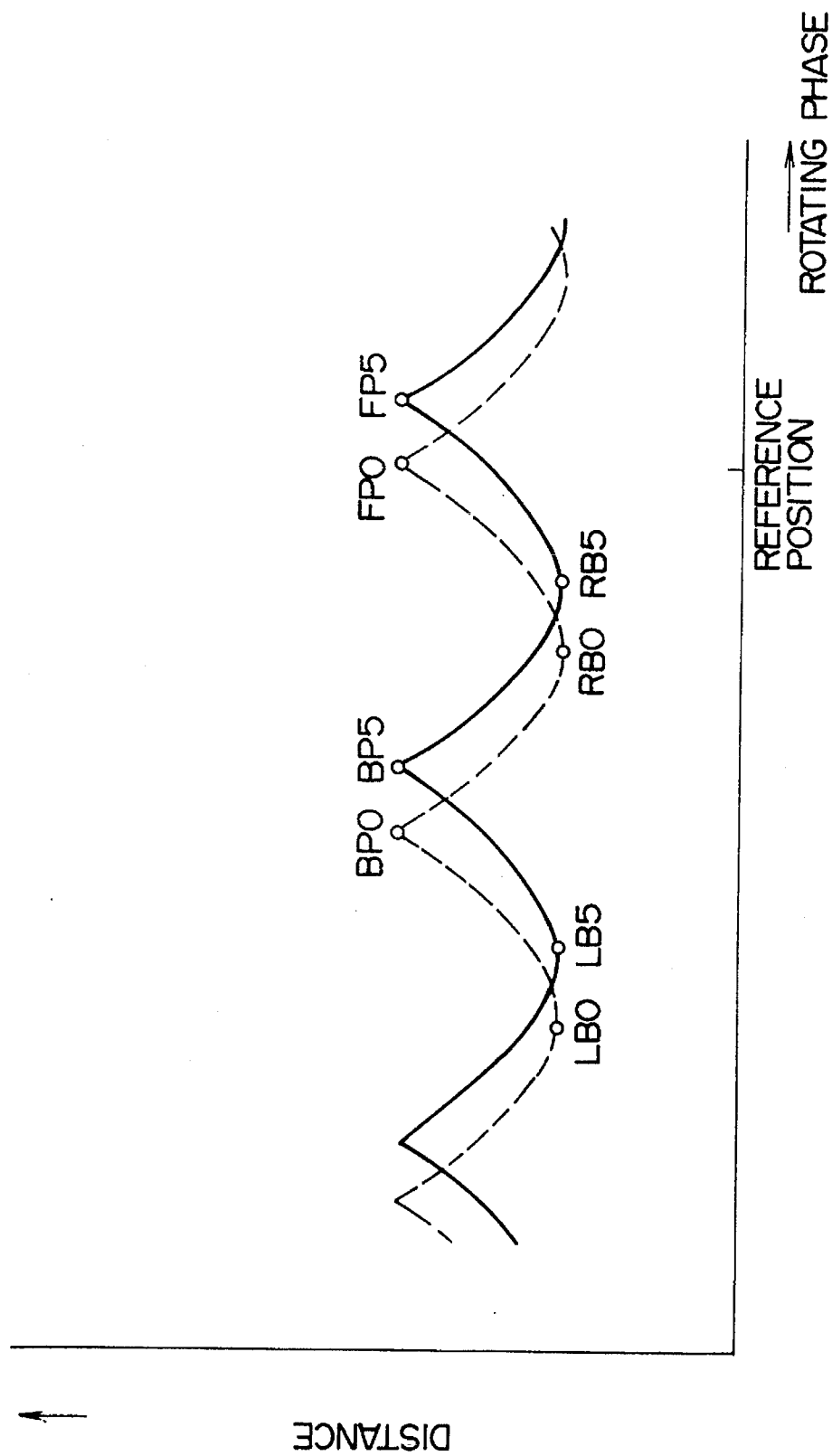
FIG. 17 is a view showing a waveform of a sensor signal in such a case that the torch coordinate system and the workpiece coordinate system are shifted from each other around Xt-axis.

Finally, a signal waveform which is obtained when the torch coordinate system 3 and the workpiece coordinate system 4 are shifted from each other by an angle α around the Xt-axis is shown by a solid line in FIG. 17. Extreme points obtained in this condition are denoted as FP5, BP5, RB5, LB5, respectively. Further, the signal waveform obtained in such a case that torch coordinate system 3 and the workpiece coordinate system 4 coincide with each other is indicated by a broken line.

As clearly understood from FIG. 17, the phases at the points FP5, BP5 which are local maximum points in the waveform and at the points RB5, LB5 which are local minimum points, with respect to the reference position are shifted as a whole if the torch coordinate system 3 and the workpiece coordinate system 4 are shifted from each other around the Xt-axis.

FIG. 18 is a view which shows that the phases at the extreme points FP, BP, LB, RB, in such a case that the torch coordinate system 3 and the workpiece coordinate system 4 are shifted from each other in both Xt-axial and Zt-axial directions, and also around the Xt-axis, Yt-axis and Zt-axis, are given on the rotating and scanning orbit of the capacitance type distance sensor 5. In such a case, the positional relationship to be obtained is the shift value around the Xt-axis, that is, the angle a between the welding line Yw and the Yt-axis.

As mentioned above, if the shift value α around the Xt-axis can be obtained, the positional relationship around the Xt-axis can be solely calculated, irrespective of the positional relationship between the torch coordinate system 3 and the workpiece coordinate system 4.

Referring to FIG. 18, the straight line extending between the local minimum points RB, LB and indicated by the broken line in the figure and the straight line extending between the points FP, BP, that is, the Yw-axis are always orthogonal to each other on the rotating and scanning orbital plane, and this fact can be understood from the consideration of the shape of the workpiece and the definition of the coordinate systems as well as from the geometrical consideration of the rotating and scanning orbit.

Accordingly, the angle a can be calculated in a direction which is indicated by the averaged value B between the phase at the point RB with respect to the reference position and the phase at the point LB with respect to the reference position, or in a direction orthogonal to a direction indicated by the averaged value P between the phase at the point FP with respect to the reference position and the phase at the point BP with respect to the reference position, and with this calculation method, the positional relationship around the Xt-axis can be easily calculated.

With the above-mentioned operation, of 6 components which give the positional relationship between the torch coordinate system 3 and the workpiece coordinate system 4, five components can be easily calculated by rotating and sweeping the capacitance type distance sensor 5.

As already mentioned above, by moving the robot arm 1 in such a way that the thus calculated positional relationship coincides with a desired positional relationship previously set and stored in memory, the workpiece whose direction and position are both unknown can be automatically detected, and the robot arm 1 or the torch 13 can be positioned at a desired target position or torch posture.

As to the positional relationship in the Yt-axial direction or the positional relationship of the welding line, as the remaining one component which gives the positional relationship, it is satisfactory to always set zero for the detection of the start point, and if a value other than zero is given, the robot arm 1 is moved to a position shifted from the present position in the direction of the welding line. With the repetitions of this procedure, the above-mentioned operation is successively carried out so that the robot arm 1 can be moved so as to automatically trace the welding line while a desired target position and torch posture are maintained.

This does mean that the component in the Yt-axial direction among the six components indicating the positional relationship between the torch coordinate system 3 and the workpiece coordinate system 4 is a variable which determines the direction and the speed with which the welding line is traced. By changing this value under the robot operator's instructions, the direction of the welding line and the welding speed can be arbitrarily selected, or adjusted.

Further, if the curvature of the welding line, the operating speeds of the shafts of the robot arms and the like are calculated from the positional relationship between the torch coordinate system 3 and the workpiece coordinate system 4 which has been obtained by the above-mentioned calculation method so that the value of the component in the Yt-axial direction is increased and deceased in dependence thereupon, the welding speed can be optimumly adjusted to fit the occasion.

However, in such a case that the robot arm is continuously operated tracing the welding line, an error occurs in the result of the calculation of the positional relationship made by the above-mentioned calculation method. This is caused because the above-mentioned calculation method is made by estimating that the robot arm is stationary, or more specifically, the positional relationship between the torch coordinate system 3 and the workpiece coordinate system 4 does not vary within the one rotation scanning time of the capacitance type distance sensor 5. The faster the speed at which the welding line is traced, the larger the difference between this estimation and the actual condition, and accordingly, the error increases. This fact causes restraint to the allowable speed of tracing the welding line.

In order to reduce this error, it is effective to shorten the rotating and scanning period of the capacitance type distance sensor 5 so that the time per one revolution scanning is shortened in order that the continuous operation of the robot arm is negligible. However, actually, the response frequency of the capacitance type distance sensor 5 and various processing times have limits, and further, the rotating and sweeping period which can be realized also has a limit.

Thus, according to the present invention, by hypothetically creating a condition in which the positional relationship is stationary, from actual data in such a condition that the positional relationship between the torch coordinate system 3 and the workpiece coordinate system 4 varies within one rotating and scanning time of the capacitance type distance sensor 5, this error can be reduced, and explanation will be made of a specific method therefor with reference to the drawings.

Figure 19:
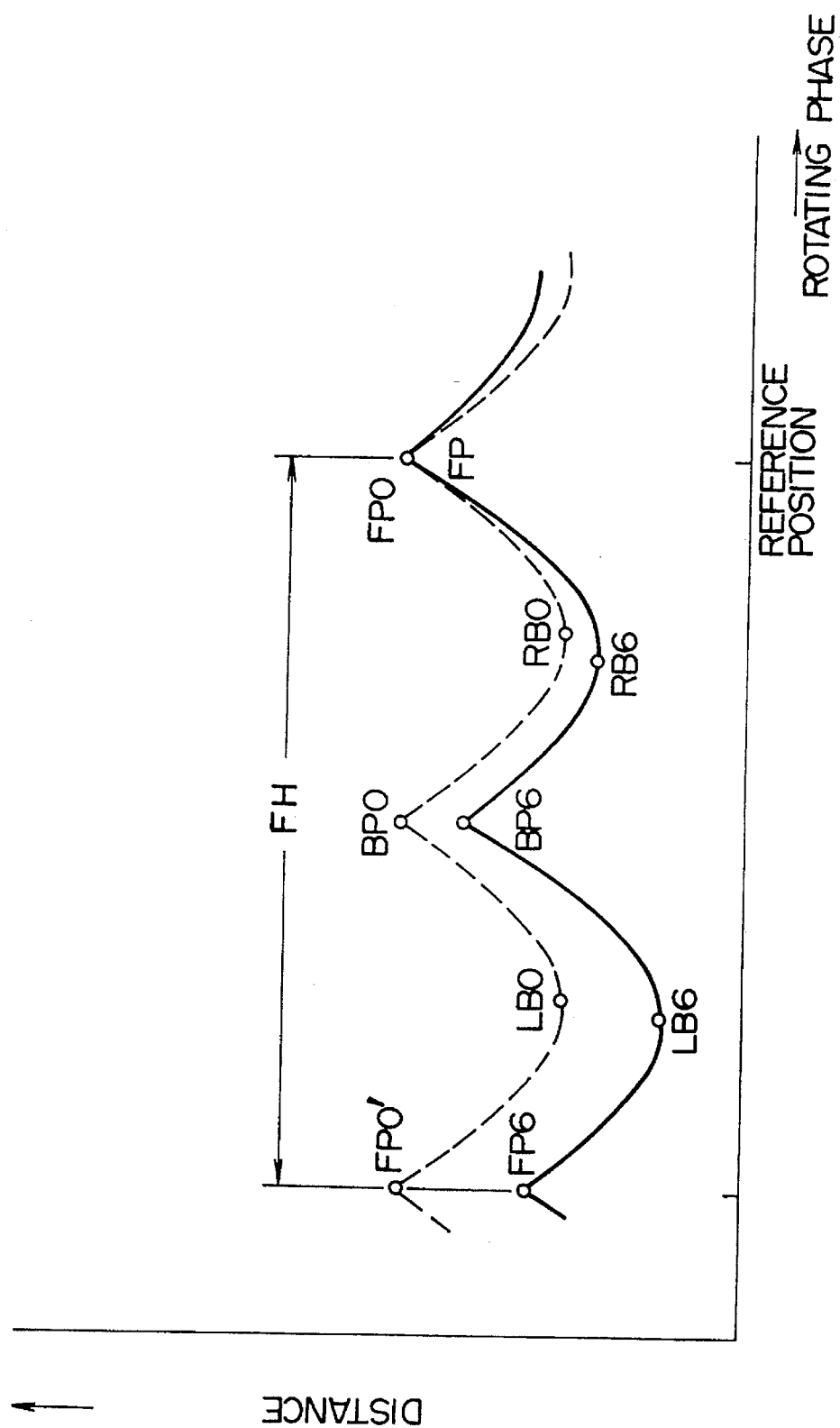
FIG. 19 is a view showing a waveform of a sensor signal in such a case the torch coordinate system and the workpiece coordinate system are shifted from each other within a single scanning; and, FIG. 20 is a perspective view illustrating a workpiece to be welded which is used in an example of teaching according to the present invention.

In FIG. 19, a signal waveform obtained in such a case that the robot arm is moved at a constant speed in the Xt-axial direction from a condition in which the torch coordinate system 3 and the workpiece coordinate system 4 are shifted from each other in the Xt-axial direction to a condition in which both coordinate systems coincide with each other, during one revolution scanning of the capacitance type distance sensor 5, is indicted by a solid line, and extreme points in this condition are denoted as FP6, RB6, BP6, LB6, respectively.

Further, a signal waveform obtained in such a case that transition is made while a condition in which the torch coordinate system 3 and the workpiece coordinate system 4 coincide with each other is maintained as it is, is indicated by a broken line, and extreme points in this case are denoted as FP0, RB0, BP0, LB0, respectively.

Then, the difference between the value of one local maximum point FP6 and the value of the same local maximum point FP6' one revolution before is divided by a phase difference PH6 between both extreme points so as to obtain a displacement DDXt per unit phase, and the DDXt is multiplied by phase differences between the point FP6 and the other points RB6, BP6, LB6 located between both local maximum points so as to obtain compensating values for these extreme points. Accordingly, the compensation is made for the respective values.

Further, with the use of a displacement Xt in the Xt-axial direction per one revolution scanning obtained form the above-mentioned displacement DDXt per unit pahse, compensating values for the phases of the local points PB6, LB6 are calculated, and these phases are compensated.

Thus, an error which is caused by moving the robot arm in the Xt-axial direction during one revolution scanning of the capacitance type distance sensor 5 can be compensated.

Similarly, as to such a case that the robot arm is moved at a constant speed in the Zt-axial direction during one revolution scanning of the capacitance type distance sensor 5, with the use of such a fact that a straight line extending between the local minimum points RB, LB and a straight line extending between the local maximum points FP, BP are orthogonal to each other as explained with reference to FIG. 18, a displacement in the Zt-axial direction during one revolution scanning is obtained, and accordingly, the phases at the extreme points can be compensated with the use of thus obtained displacement.

That is, in such a case that the robot arm is moved in the Zt-axial direction during one revolution scanning, the straight line extending between the above-mentioned local minimum points RB, LB does not become orthogonal to the straight line extending between the local maximum points FP, BP. Accordingly, a displacement in the Zt-axial direction per revolution scanning is obtained from a difference between an angle defined by both straight lines and a right angle and a rotating scanning radius, and with the use of the thus obtained displacement, compensation values for phases at the extreme points are calculated, similar to the case in which the robot arm is moved in the Xt-axial direction, thereby it is possible to compensate the respective phases.

Thus, an error caused by the movement of the robot arm in the Zt-axial direction during one revolution scanning of the capacitance type distance sensor 5, can be compensated.

In such a case that the robot arm is moved while the arm actually traces the welding line, the movement of the robot arm during one revolution scanning of the capacitance type distance sensor 5 is not always constant. However, since the rotating and scanning period of the capacitance type distance sensor 5 is short, and since the one revolution time is very short, no practical problem occurs if the compensation is made with such consideration that the robot arm is moved at a constant speed during one revolution scanning.

As mentioned above, the positional relationship calculating means 9 can precisely calculate the positional relationship between the torch coordinate system 3 and the workpiece coordinate system 4.

The comparison between the teaching time of the welding robot according to the present invention and that of a conventional method using a manipulating box is shown in Table 1.

TABLE 1

| WORKER SKILL | A UPPER | B MIDDLE | C | D LOWER | E | AVERAGE |
|---|---|---|---|---|---|---|
| TEACHING TIME BY INVENTION | 230 | 240 | 259 | 280 | 285 | 244 |
| CONVENTIONAL TEACHING TIME (sec) | 564 | 752 | 855 | 1157 | 1240 | 860 |
| RATE TO | 40.8 | 31.9 | 30.3 | 24.2 | 23.0 | 28.4 |

TABLE 1-continued

| WORKER SKILL | A UPPER | B | C MIDDLE | D | E LOWER | AVERAGE |
|---|---|---|---|---|---|---|
| CONVENTIONAL TEACHING (sec) | | | | | | |

Figure 20:
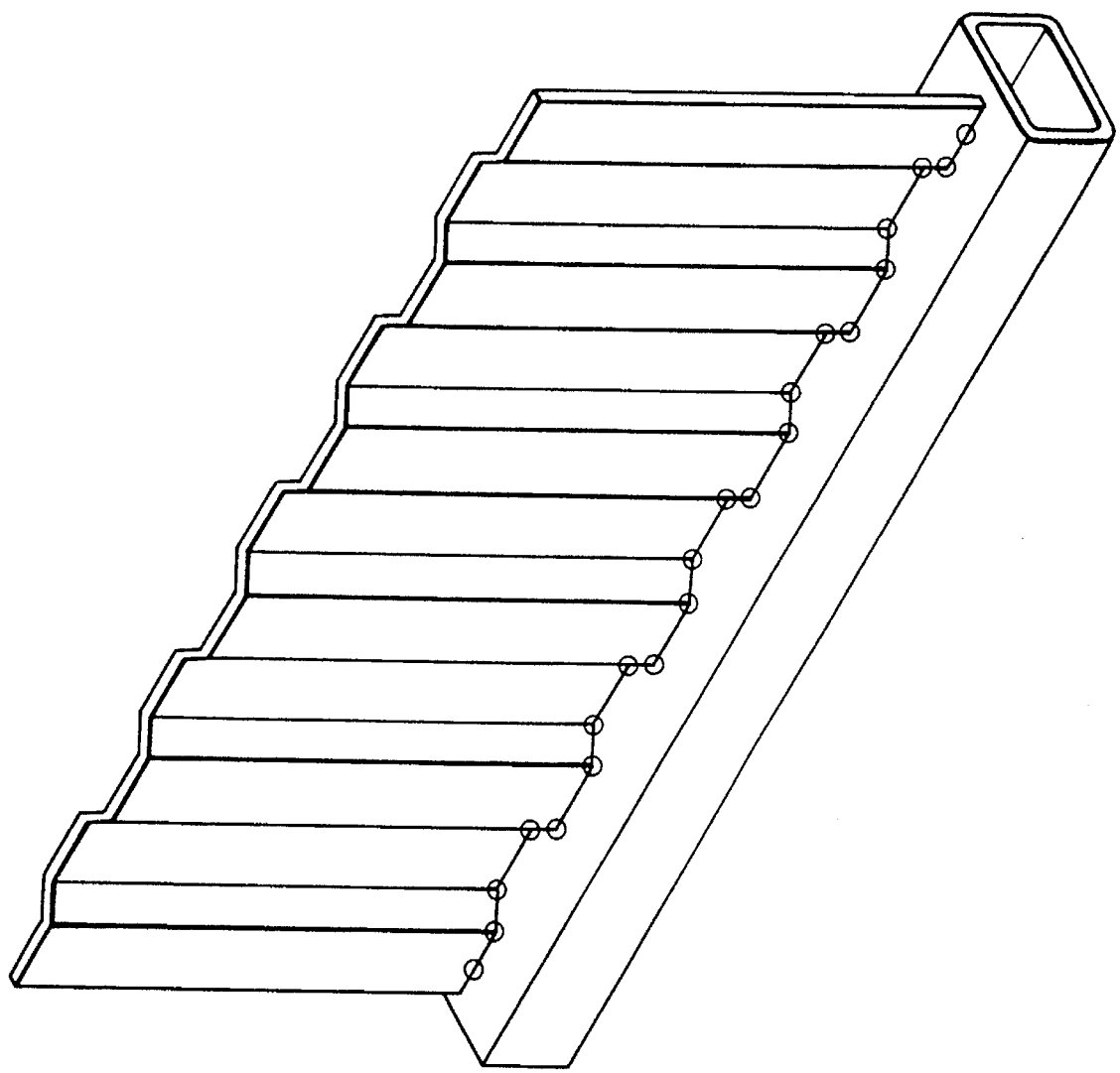

The teaching was carried out for a workpiece shown in FIG. 20, using circle marks as teaching points. In this teaching, it was designated that the torch angle with respect to a horizontal plane was set to 45 deg., and the advancing or backing angle with respect to the welding line was set to zero. The number of teaching points was 22, and the welding length was 810 mm at that time.

As clear from Table 1, the teaching time with the use of the welding robot according to the present invention can be reduced by about 30% in comparison with that of the conventional method. Further, even a beginner can carry out a teaching in a time substantially equal to that taken by a skilled worker, irrespective of the skill of the worker. In view of this fact, it is possible to obtain excellent technical effects and advantages.

According to the present invention as mentioned above, the capacitance type distance sensor 5 is rotated and swept by the rotating and sweeping means 6, a feature point is extracted from a signal waveform by the signal waveform processing means 8 with the use of distance data to the objective workpiece 2 and rotating phase data, the positional relationship between the torch coordinate system 3 and the workpiece coordinate system 4 is calculated from the distance data and rotating phase data per the thus extracted feature point by the positional relationship calculating means 9, and the robot arm 1 is moved by the robot control means in such a way that the thus calculated positional relationship coincides with a previously set and stored positional relationship. Accordingly, the robot arm 1 or the torch 13 can be autonomously moved so as to have a previously set and stored positional relationship, that is, it can be moved to a desired welding torch position or posture.

Although explanation has been made of such a structure that the capacitance type distance sensor 5 is previously attached to the rotating and sweeping means 6, and accordingly, it is attached to the welding torch 13 together with the rotating and sweeping means 6, according to the present invention, a part of members constituting the torch 13, such as a chip adapted to be rotated together with the electrode rod of the capacitance type distance sensor 5 can be replaced so that an electrode rod rotating mechanism belonging to the torch can be used as the rotating and sweeping means 6.

Further, although explanation has been made of an encoder that is used as the rotating phase detecting means 7, according to the present invention, it goes without saying that the rotating phase detecting means 7 can be realized by precisely rotating the rotating and sweeping means 6 so as to measure the time.

Further, although explanation has been made of a compensating method for such a case that the robot arm is continuously moved in the Xt-axial direction and the Zt-axial direction, according to the present invention, compensation can be made for other positional relationship such that the robot arm is continuously moved around each of the axes along with the similar consideration so that each of the extreme points can be compensated with the use of the difference between the value of an arbitrary extreme point and the value of the extreme point substantially one revolution before. Further, as already mentioned, although the above-mentioned compensation is made by use of displacements per revolution scanning in several directions, if the positional relationship calculated by estimating that the positional relationship is stationary, is subtracted from the positional relationship which has been calculated one revolution scanning before so as to approximately calculate movements per revolution, the positional relationship is again calculated by compensating the values of the extreme points and the phases at these points with the use of the thus approximately calculated movements, and accordingly, it is possible to reduce errors.

Further, according to the present invention, instead of the capacitance type distance sensor, another type of a noncontact distance sensor such as a laser type distance sensor can be used.

Industrially Usability

The welding robot according to the present invention, as mentioned above, can be suitably used for easily and efficiently carrying out a teaching work for a workpiece which has a complicated shape so as to require several teaching points, or for a workpiece which requires several operation programs due to mutikind and small quantity production, with a high degree of accuracy by a worker who has no teaching skill.

We claim:

1. A welding robot for welding an objective workpiece, comprising:

a robot arm having a distal end defining the origin of a first coordinate system;

a noncontact distance sensor attached to the distal end of said robot arm, for measuring a distance to the objective workpiece and delivering distance data;

a rotating and sweeping means connected to said robot arm and having a rotating center axis corresponding to the first coordinate system, for rotating and sweeping said noncontact distance sensor;

a rotating phase detecting means for detecting a rotating phase of said noncontact distance sensor and delivering rotating angle phase data;

a signal waveform processing means operatively connected to said noncontact distance sensor and said rotating phase detecting means for forming a signal waveform obtained by the distance data and the rotating angle phase data, extracting an extreme feature point from the signal waveform, and delivering distance data and rotating angle phase data per feature point;

a relationship calculating means operatively connected to said signal waveform processing means for calculating an actual relationship between the first coordinate system, and a second coordinate system having an origin defined on the objective workpiece, from the distance data and the rotating angle phase data delivered from said signal waveform processing means;

a relationship setting and storing means for presetting and pre-storing a reference relationship between the first coordinate system and the second coordinate system; and a robot control means operatively connected to said relationship calculating means and said relationship setting and storing means for moving said robot arm so that the actual relationship between the first coordinate system and the second coordinate system, calculated by said relationship calculating means, coincides with the reference relationship between the first coordinate system and the second coordinate system.

2. A welding robot as set forth in claim 1, wherein said noncontact distance sensor is a capacitance type distance sensor for measuring a distance using a capacitance between an electrode part of said sensor and the objective workpiece.

3. A welding robot as set forth in claim 2, wherein said capacitance type distance sensor has a conical electrode part.

4. A welding robot as set forth in claim 2, wherein said capacitance type distance sensor has a plurality of sensor electrodes which are coaxially arranged and which are separately operated.

5. A welding robot as set forth in claim 2, wherein said capacitance type distance sensor is attached to said rotating and sweeping means through an intermediate electrically insulating member.

6. A welding robot as set forth in claim 1, wherein successive extreme points having a phase therebetween that is lower than a predetermined angle are not extracted as the feature points by said signal waveform processing means.

7. A welding robot as set forth in claim 1, wherein two successive extreme points having a value difference less than a predetermined value are not extracted as the feature points by said signal waveform processing means.

8. A welding robot as set forth in claim 1, wherein an extreme point having a distance data delivered by said noncontact distance sensor out of a predetermined range is not extracted as a feature point by said signal waveform processing means.

9. A welding robot as set forth in claim 1, wherein said relationship calculation means compensates for a difference in the distance data and the rotating angle phase data at a plurality of successive feature points, and thereafter, calculates a positional relationship between the first coordinate system and the second coordinate system.

10. A welding robot as set forth in claim 1, wherein said relationship calculating means compensates for distance data and rotating angle phase data at a plurality of feature points as a result of a prior actual calculated relationship, and thereafter calculates the actual relationship between the first and second coordinate systems.

11. A welding robot as set forth in claim 1, wherein said relationship calculating means adjusts the actual relationship in a direction of a welding line using a calculation result of a prior actual relationship between the first coordinate system and the second coordinate system.

12. A welding robot as set forth in claim 1, further comprising a welding torch mounted at the distal end of said robot arm; wherein said noncontact distance sensor and said rotating and sweeping means are removably attached to said welding torch.

13. A welding robot as set forth in claim 1, wherein said rotating and sweeping means comprises an electrode rod rotating means for a rotary arc welding torch attached to said robot arm, and said noncontact distance sensor comprises a contact chip of said rotary arc welding torch.

* * * * *